United States Patent
Monzawa et al.

(10) Patent No.: US 6,848,053 B1
(45) Date of Patent: Jan. 25, 2005

(54) OPTICAL NETWORK UNIT AND OPTICAL LINE TERMINAL

(75) Inventors: Takashi Monzawa, Osaka (JP); Kenji Miura, Osaka (JP); Tamotsu Matsuo, Osaka (JP); Hideki Shiono, Osaka (JP); Yoshimi Toyoda, Osaka (JP); Toshinori Koyanagi, Kawasaki (JP); Setsuo Abiru, Kawasaki (JP); Jun Asato, Osaka (JP); Shinichi Fujiyoshi, Fukuoka (JP); Kazuhiro Uchida, Fukuoka (JP); Kazuya Ryu, Fukuoka (JP); Katsuhiko Hirashima, Fukuoka (JP); Tateo Shimaru, Fukuoka (JP); Mitsuharu Wakayoshi, Fukuoka (JP); Toshiyuki Sakai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/515,909

(22) Filed: Feb. 29, 2000

(30) Foreign Application Priority Data

Apr. 16, 1999 (JP) .......................................... 11-109687

(51) Int. Cl.$^7$ ................................................. H04K 1/00
(52) U.S. Cl. .......................... 713/200; 713/54; 380/256
(58) Field of Search ............................. 398/25, 30, 66, 398/68, 71, 70, 154, 140; 380/256, 47, 260, 261, 264, 273, 274

(56) References Cited

U.S. PATENT DOCUMENTS

| | | | |
|---|---|---|---|
| 4,531,020 A | * | 7/1985 | Wechselberger et al. .... 380/239 |
| 4,965,804 A | | 10/1990 | Trbovich et al. |
| 5,502,767 A | | 3/1996 | Sasuta et al. |
| 5,805,705 A | | 9/1998 | Gray et al. |
| 5,920,627 A | | 7/1999 | Mionet et al. |
| 5,982,845 A | * | 11/1999 | Sidoti et al. .................... 378/4 |
| 6,021,391 A | | 2/2000 | Shyu |
| 6,029,046 A | * | 2/2000 | Khan et al. .................... 725/31 |
| 6,212,278 B1 | * | 4/2001 | Bacon et al. ................. 380/240 |
| 6,424,714 B1 | * | 7/2002 | Wasilewski et al. ......... 380/200 |
| 6,424,717 B1 | * | 7/2002 | Pinder et al. ................. 380/239 |
| 6,564,324 B2 | * | 5/2003 | Bacon et al. ................. 713/189 |

FOREIGN PATENT DOCUMENTS

| | | |
|---|---|---|
| EP | 0874503 A2 | 10/1998 |
| EP | 1032159 A2 | 8/2000 |
| GB | 2078063 A | 12/1980 |
| GB | 2079109 A | 1/1982 |
| GB | 2124856 A | 2/1984 |
| JP | 6-237248 | 8/1994 |
| JP | 8-331119 | 12/1996 |

* cited by examiner

Primary Examiner—Ayaz Sheikh
Assistant Examiner—Michael Vaughan
(74) Attorney, Agent, or Firm—Katten Muchin Zavis Rosenman

(57) ABSTRACT

An optical network unit and an optical line terminal which efficiently control the data receiving and dechurning processes in a passive optical network. In a churning parameter memory subsystem, a first memory bank stores churning parameters that are currently used, while a second memory bank stores updates made to the churning parameters. Under the control of the churning parameter memory subsystem, those first and second memory banks change their roles with each other at a churning key updating time point. A data dechurning unit receives a data stream consisting of a plurality of frames and dechurns the information contained in the data stream, according to the stored churning parameters. When an update is done to the parameters in a certain frame, the data dechurning unit makes the update effective at the next frame, thus starting data dechurning operations from the next frame.

10 Claims, 25 Drawing Sheets

OPTICAL NETWORK UNIT AND OPTICAL LINE TERMINAL

BACKGROUND OF THE INVENTION

1. Field of the Invention

The present invention relates to an optical network unit and an optical line terminal. More particularly, the present invention relates to an optical network unit coupled to an optical access network system, which receives a data stream and dechurns information contained in the received data stream by using a churning key. The invention also relates to an optical line terminal coupled to the optical access network system, which transmits a data stream containing information that is churned with a churning key.

2. Description of the Related Art

Increasing numbers of telecommunication and multimedia services are provided today to serve for the growing market needs, including video on demand, cable TV, and high-speed access to computer networks. Those high-bandwidth services, however, should not raise the cost to subscribers. Here, optical access network systems are expected to play an essential role, connecting subscriber premises to the nearest local office exchange through fiber optic cables, rather than conventional metallic wires.

One of such systems is called the Passive Double Star (PDS), which enables a plurality of subscribers to share a single optical fiber line by using star couplers. Particularly in Europe, the Passive Optical Network (PON) system, synonymous with PDS, is of great interest as an enabling technology for the Fiber To The Home (FTTH) services. In the scenarios toward FTTH, the access network has to provide guaranteed bandwidths and quality of services to meet the requirements for real-time voice and video communication. To this end, the Full Service Access Networks (FSAN) initiative has a central role in the development of ATM-PON systems based on the Asynchronous Transfer Mode (ATM) technologies. The FSAN is an organization formed by major telephone companies to promote worldwide optical network businesses.

FIG. 25 shows a typical structure of an ATM-PON system. Optical network units (ONUs) 101a to 101n are deployed in subscriber premises 100a to 100n, while an optical line terminal (OLT) 201 is placed in a local office 200. Fiber optic cables and a star coupler 300 interconnect those ONUs 101a to 101n and OLT 201 in a point-to-multipoint fashion. In the subscriber premises 100a to 100n, telephone equipment and/or CATV equipment is coupled to the ONUs 101a to 101n. Connected to the OLT 201 in the local office 200 is ATM and ISDN switching equipment 202.

In the downstream direction, the local office 200 broadcasts data (i.e., downstream cells) toward the subscriber premises 100a to 100n over a single optical fiber cable. The star coupler 300 splits the optical signal into a plurality of signals in a tree and branch form, so as to deliver the information to individual subscribers' ONUs. In the upstream direction, ATM cells are transmitted from the subscriber premises 100a to 100n toward the local office 200 over the same branch cables. The star coupler 300 consolidates them into a single optical signal for delivery to the local office 200 over a single fiber cable.

As described above, the ATM-PON systems are ATM-based, optically-coupled access networks which provide point-to-multipoint (1:n) connections between a local office and a plurality of customers through the use of star couplers 300. The ITU-T Recommendation G.983.1 is one of the relevant international standard specifications for such PON-based broadband optical access systems. This G.983.1 includes description of a data encryption function termed "churning" to offer a protection capability for data confidentiality purposes. This function is mandatory because, in a PON system, the OLT always physically broadcasts information downstream, but only one ONU at a time can decode the information. More specifically, in the system of FIG. 25, the OLT 201 first sends a certain downstream message to request each ONU (e.g., ONU 101a) to provide its churning key. In response to this request, the ONU 101a generates a churning key and sends it back to the OLT 201. With the received churning key, the OLT 201 encrypts, or churns, downstream cells before sending them out to the ONU 101a. This data churning operation for downstream cells are performed on an individual virtual path (VP) basis. The OLT 201 notifies the ONU 101a of which virtual path is churned or not, by sending a special downstream message indicating the virtual path identifier (VPI) of a particular path that is churned or not churned. This information is referred to herein as "churning parameters."

In summary, all ONUs in an ATM-PON system have their respective churning keys, and the churning of downstream information can be enabled or disabled separately for each VPI. The OLT sends downstream messages to notify each ONU of churning parameters before sending downstream cells. When data is received through a churned VP, the destination ONU decodes the data with its own churning key.

One problem with the above-described conventional system is that the ITU-T Recommendation G.983.1 lacks definitions for some specifics of the data dechurning functions to be used in ATM-PON systems. Take churning parameters stored in the ONU 101a for example. While those parameters are supplied from the OLT 201, the Recommendation G.983.1 does not stipulate when to activate the supplied parameters. This means that the data dechurning operation in the ONU 101a could be shifted in time, relative to the data churning operation in the OLT 201, and the time shift may grow up to such a critical level where the ONU 101a cannot decode the churned data correctly.

Another problem with the conventional ONUs is that they have to reload churning parameters from the OLT when they are rebooted after a power shutdown. This parameter reloading is a time-consuming process, while it is mandatory because the shutdown of ONUs clears out their stored churning parameters.

As seen from the above, conventional ATM-PON systems are still immature in terms of data churning techniques. It is therefore necessary to establish improved communication control algorithms in order to make ATM-PON systems truly practical.

SUMMARY OF THE INVENTION

Taking the above into consideration, an object of the present invention is to provide an optical network unit which efficiently controls the data receiving and dechurning processes.

To accomplish the above object, according to the present invention, there is provided an optical network unit coupled to an optical access network system, which receives a data stream and dechurns information contained in the received data stream by using a churning key. The two major elements of this optical network unit are: (a) a churning parameter memory subsystem, and (b) a data dechurning unit. The churning parameter memory subsystem stores churning parameters that indicate which logical connections are churned or not churned. This subsystem comprises (a1) a first memory bank which is initially assigned an active role to store the churning parameters that are currently used, and (a2) a second memory bank which is initially assigned a backup role to store newly updated churning parameters. Here, the first memory bank and second memory bank are controlled so that the active and backup roles will alternate with each other at every churning key updating time point where an updated churning key becomes effective. The data dechurning unit receives a data stream consisting of a plurality of frames and dechurning the information contained in the data stream according to the churning parameters stored in the first or second memory bank currently playing the active role. Here, the churning parameters are activated at the beginning of a frame subsequent to the churning key updating time point.

Further, it is another object of the present invention to provide an optical line terminal with improved communication control algorithms to efficiently manage data transmission processes.

To accomplish the above object, according to the present invention, there is provided an optical line terminal coupled to an optical access network system, which transmits a data stream containing information that is churned by using a churning key. This optical line terminal comprises the following elements: (a) a flag controller which controls flags when sending the data stream to a receiving end; and (b) a churning parameter transmission controller which controls the transmission of churning parameters to the receiving end, based on the status of the flags. Here, the churning parameters indicate which logical connections are churned or not churned.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
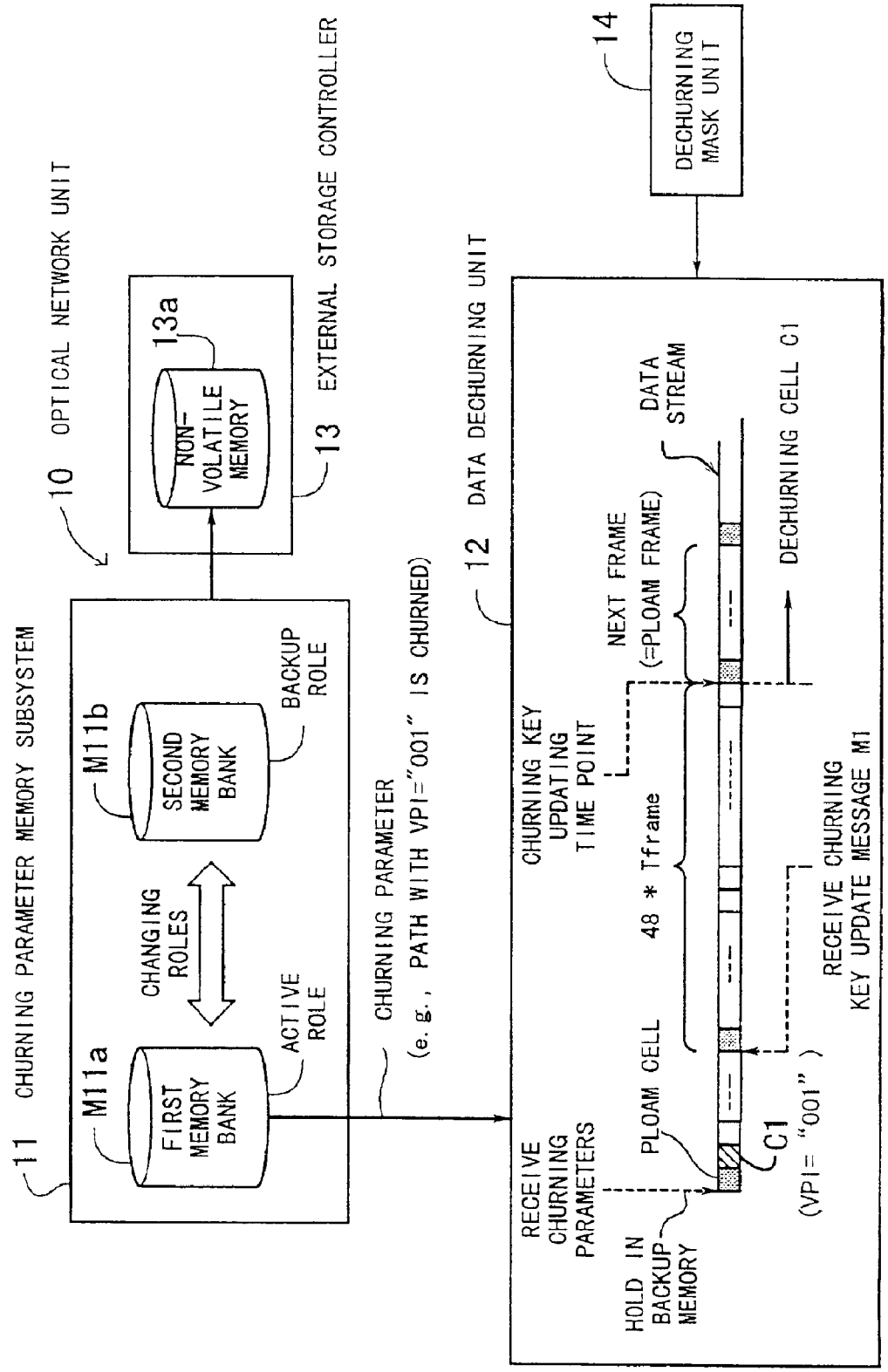
FIG. 1 is a conceptual view of an optical network unit according to the present invention.

FIG. 1 is a conceptual view of an optical network unit (ONU) 10 according to the present invention. This optical network unit 10, coupled to an optical access network system (e.g., ATM-PON), receives a data stream from an optical line terminal (OLT, not shown) in the nearest local office. Here, the term "data stream" refers to consecutive small data packets, or cells, carried over the network. The ONU 10 decodes the churned part of the received data stream with a churning key which was produced by the ONU 10 itself.

The ONU 10 comprises a churning parameter memory subsystem 11 having two storage areas to store churning parameters; they are a first memory bank M11a and a second memory bank M11b. The churning parameters are such setup information that shows whether each logical connection applies a churning process to send data. More specifically, they are essentially a collection of simple flags each corresponding to an individual virtual path identifier (VPI) to indicate which virtual path (VP) is churned or not churned.

The two memory banks M11a and M11b in the churning parameter memory subsystem 11 change their roles alternately. In FIG. 1, the first memory M11a now plays an active role, storing the current churning parameters which are read out for use in data dechurning processes. On the other hand, the second memory bank M11b is assigned a backup role to store newly updated churning parameters.

The churning parameter memory subsystem 11 controls data writing operations to the first memory M11a and second memory bank M11b. At each time point the churning key is updated (i.e., when the current key is replaced with a new churning key), the churning parameter memory subsystem 11 alternates the roles of the two memory banks M11a and M11b. The details of this operation will be described later.

The ONU 10 further comprises a data dechurning unit 12, which receives a data stream consisting of a plurality of frames and dechurns it according to the churning parameters stored in the first memory M11a. When a new churning parameter is received in a certain frame, the data dechurning unit 12 activates the received new parameter from a subsequent frame after a churning key updating time point is reached. The data dechurning unit 12 uses this activated new parameter to dechurn the relevant incoming cells in that frame and later, if the parameter indicates that they are churned.

Suppose, for example, that a message in a certain frame contains a churning parameter indicating that a virtual path with a VPI value of "001" (in hexadecimal notation) is churned, and also that a cell C1 has a VPI value of "001" in its overhead section. When the churning parameter is received, the ONU 10 first saves it to the second memory bank M11b, as shown in FIG. 1. This parameter, however, will be activated only after the following conditions are met: (1) a churning key update message M1 is received, and after that, (2) a period of (48*Tframe) is elapsed, where Tframe denotes the time length of one frame with which the ONU 10 should be synchronized. In this way, the present invention provides the activation timing of newly received churning parameters, which prevents the received data stream from being dechurned in an unintended way. This issue will be discussed in more detail later.

The ONU 10 further comprises an external storage controller 13 and a dechurning mask unit 14. Churning parameters in the churning parameter memory subsystem 11 are saved into a non-volatile memory 13a for data backup purposes, under the control the external storage controller 13. The dechurning mask unit 14 disables the function of the data dechurning unit 12 during a period from the ONU's restarting time point to the next churning key updating time point. Here, the term "restarting time point" means such a time point when the ONU 10 re-enters an operating state from another state, after having left its previous operating state. The details of the external storage controller 13 and dechurning mask unit 14 will be provided in a later part of this description.

With the foregoing concept of the invention in mind, the structure and operation of the ONU 10 of FIG. 1 will now be provided in more detail below. In the following sections, the term "churned-VP parameters" may be used as a synonym of churning parameters, where appropriate.

Figure 2:
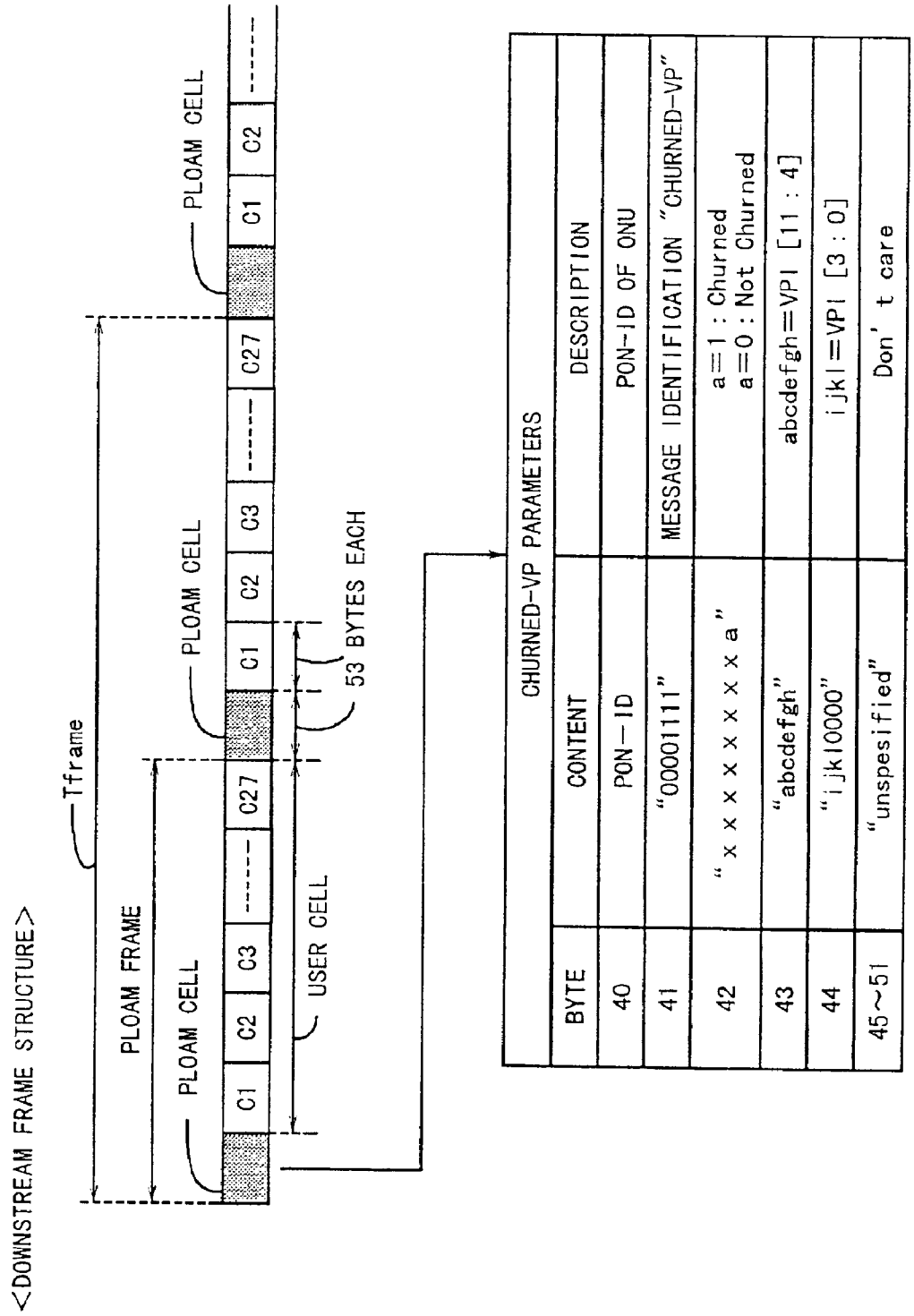
FIG. 2 is a diagram which shows a data stream structure and a format of churned-VP messages.

FIG. 2 shows the structure of a data stream and the format of churned-VP messages. Physical Layer Operation and Management (PLOAM) frames are a class of transmission frames constituting a data stream sent from the OLT. Each PLOAM frame begins with a PLOAM cell carrying control information from OLT to ONUs, which is followed by twenty-seven user cells C1 to C27 containing transmission data. Tframe denotes the time of two PLOAM frame intervals in the case that the transmission rate is 150 Mbps. Both PLOAM and user cells are ATM cells each consisting of 53 bytes.

Churned-VP message is one of the control messages delivered to ONUs in the form of PLOAM cells. This message uses the fortieth through fifty-first bytes (bytes #40 to #51) of a PLOAM cell to convey a single churning parameter. Byte #40 holds an identifier called "PON-ID," which indicates the destination ONU of this message. Byte #41 gives a message identification code "00001111" (left-most bit is MSB; right-most bit is LSB) showing that this message is a churned-VP message. Bytes #43 and #44 carry a 12-bit virtual path identifier VPI(11:0) indicating which virtual path this message relates to. Here, the notation (M:N) represents the N-th to M-th bits of a binary value, whose length is thus (M−N+1) bits where M>N. Since this 12-bit VIP value does not fit in a single byte, VPI(11:0) is divided into two parts: the upper 8 bits VPI(11:4) ("abcdefgh" in byte #43) and the lower four bits VPI(3:0) ("ijkl" in byte #44). Such a 12-bit VPI field allows the ATM-PON system to support up to 4096 virtual paths. Although not explicitly shown in FIG. 2, every user cell contains like VPI information to indicate on which virtual path it has been transported.

Byte #42 shows whether the virtual path specified in bytes #43 and #44 is churned or not churned. The table in FIG. 2 expresses this byte #42 as "xxxxxxxa," where "x" denotes "undefined" and "a" is called the "act bit." If a=1, this means that transmission data on the virtual path has been churned by the OLT, and thus the receiving ONU should dechurn it. If a=0, the data is not churned. The Recommendation G.983.1 gives no specific meanings to the remaining bytes #45 to #51 yet.

Figure 3:
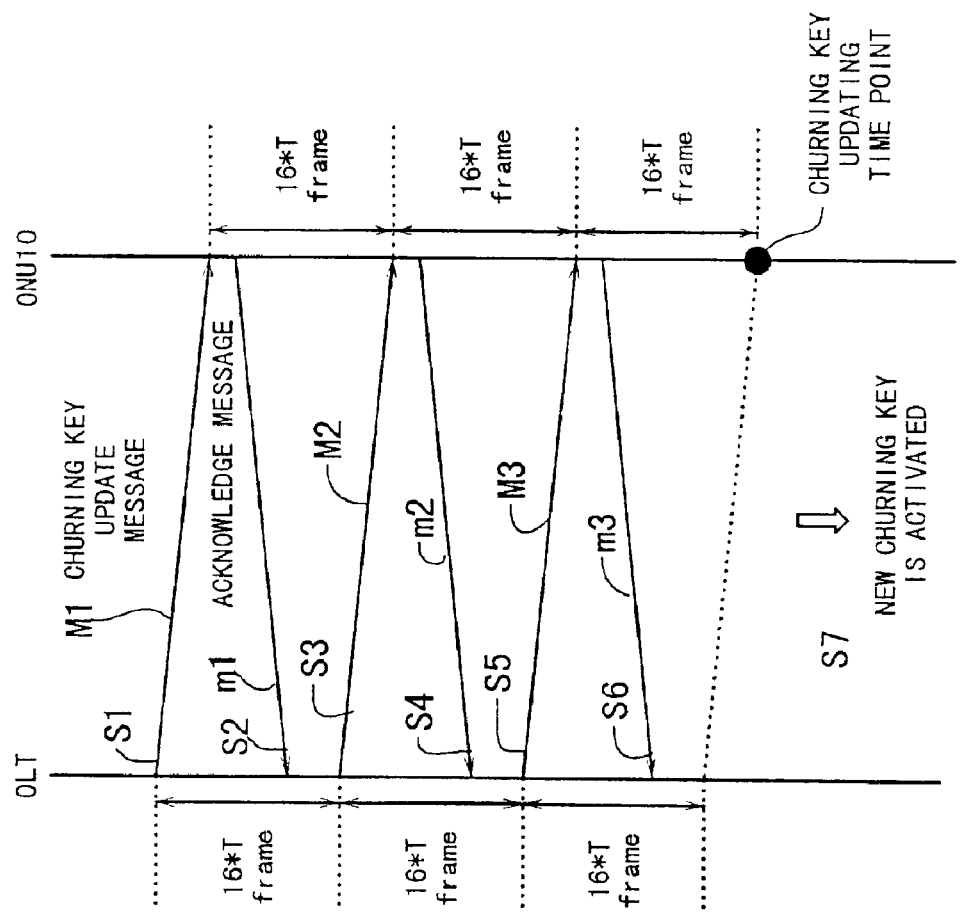
FIG. 3 is a message flow diagram which shows how to update a churning key.

Referring next to FIG. 3, the following section will describe how to update a churning key.

In the ATM-PON system including the proposed ONU 10, the churning key is updated as requested by a maintenance station which is located at the OLT's site. FIG. 3 is a message flow diagram which shows how the churning key is updated.

(S1) The OLT transmits a churning key update message M1 to the ONU 10 to request a new churning key value.

(S2) The ONU 10 produces a new churning key and sends it back to the OLT in the form of an acknowledge message m1.

(S3) When a period of (16*Tframe) has elapsed after the first churning key update message M1, the OLT transmits a second churning key update message M2 to the ONU 10.

(S4) As in step S2, the ONU 10 sends again the updated churning key to the OLT in a second acknowledge message m2.

(S5) When a period of (16*Tframe) has elapsed after the second churning key update message M2, the OLT transmits a third churning key update message M3 to the ONU 10.

(S6) As in steps S2 and S4, the ONU 10 sends back the updated churning key to the OLT in a third acknowledge message m3.

(S7) Finally, the new churning key becomes active when the interval of (48*Tframe) has elapsed after the OLT transmitted the first churning key update message M1. This time point is referred to herein as the "churning key updating time point." The OLT then starts to churn the outgoing data to the ONU 10 with this new churning key, while the ONU 10 uses the same key to dechurn the incoming data. The OLT and ONU 10 conduct the above synchronously, counting each (16* Tframe) interval at both ends.

Note here that the above sequence implies that the OLT and ONU 10 perform data churning and dechurning with the old churning key until the total period of (48* Tframe) is elapsed after the first churning key update message M1 is sent from the OLT to the ONU 10.

Figure 4:
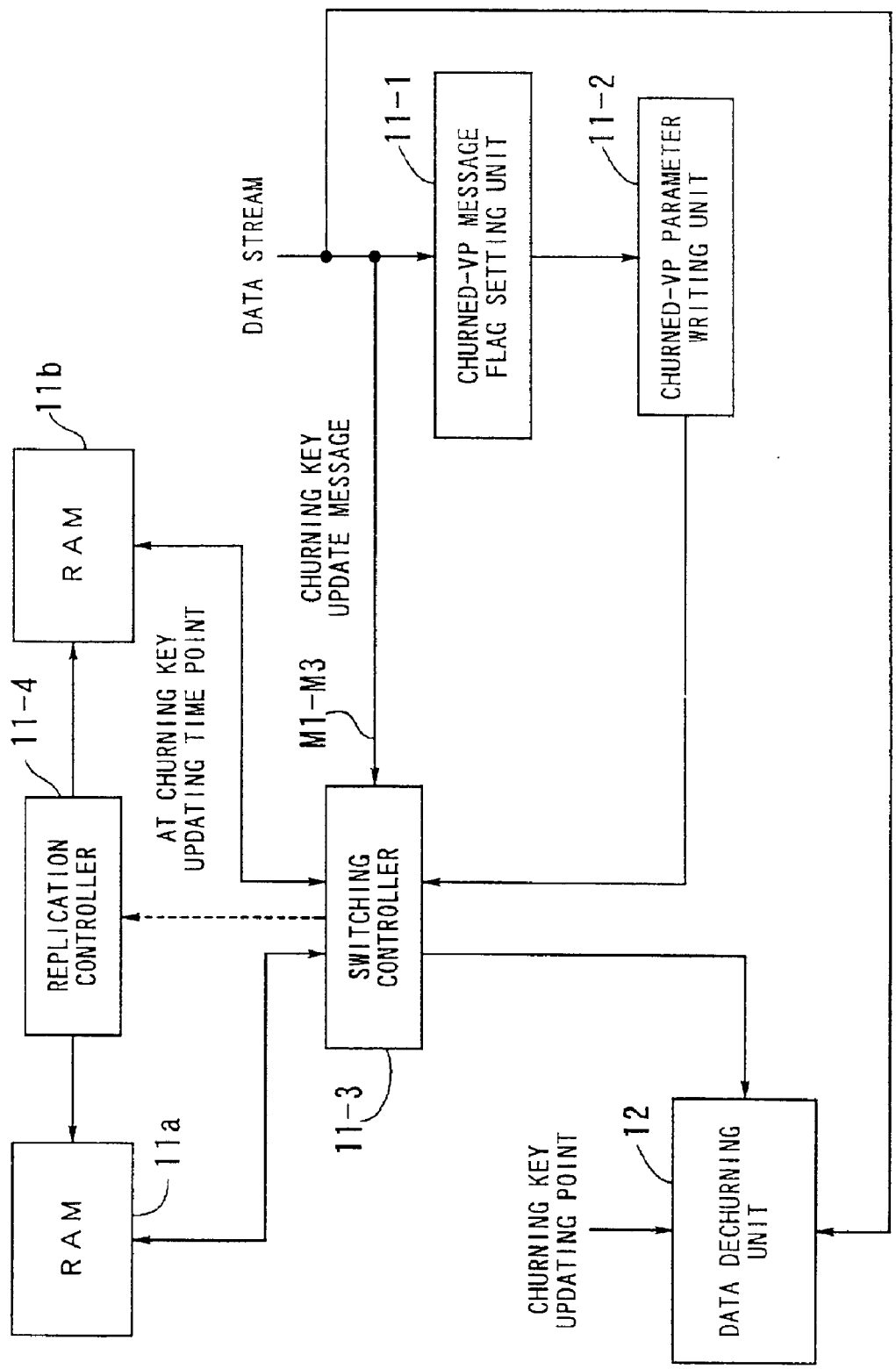
FIG. 4 is a block diagram of an ONU employing a dual RAM bank structure.

Referring now to FIG. 4, the next section will describe the dual RAM bank structure of the proposed churning parameter memory subsystem 11, as well as illustrate its data copying operation. As explained in FIG. 3, the churning key is refreshed at the churning key updating time point. This naturally means that the ONU 10 has to update its churned-VP parameters accordingly at the same time point, and therefore, the ONU 10 should make all the newly received parameters ready in its local RAM, before the next churning key updating time point is reached.

FIG. 4 is a block diagram of the ONU 10 employing a dual RAM bank structure. This ONU 10 shown in FIG. 4 differs from the one explained in FIG. 13 in that it further comprises another RAM M11b, a switching controller 11-3, and a replication controller 11-4. The switching controller 11-3 and replication controller 11-4 are integral part of the churning parameter memory subsystem 11 shown in FIG. 1.

Initially, the RAM M11a is chosen as the current active storage which provides the ONU 10 with churned-VP parameters, being addressed by VPI(11:4). The other RAM M11b works as the backup storage which is used to hold new churned-VP parameters until the next churning key updating time point. The switching controller 11-3 captures the churning key updating time point by receiving three churning key update messages M1 to M3 and ensuring that a period of (48*Tframe) has elapsed after the reception of the first churning key update message M1. When the churning key updating time point is reached, the switching controller 11-3 switches between the RAM M11a and RAM M11b, thereby making the RAM M11b active and the other RAM M11a backup. This switching operation, however, causes the backup RAM data to retrograde because the RAM M11a has not been updated since the previous churning key updating time point. To solve the problem, the replication controller 11-4 copies data from the newly activated RAM M11b to the RAM M11a that is now playing the backup role.

Figure 5:
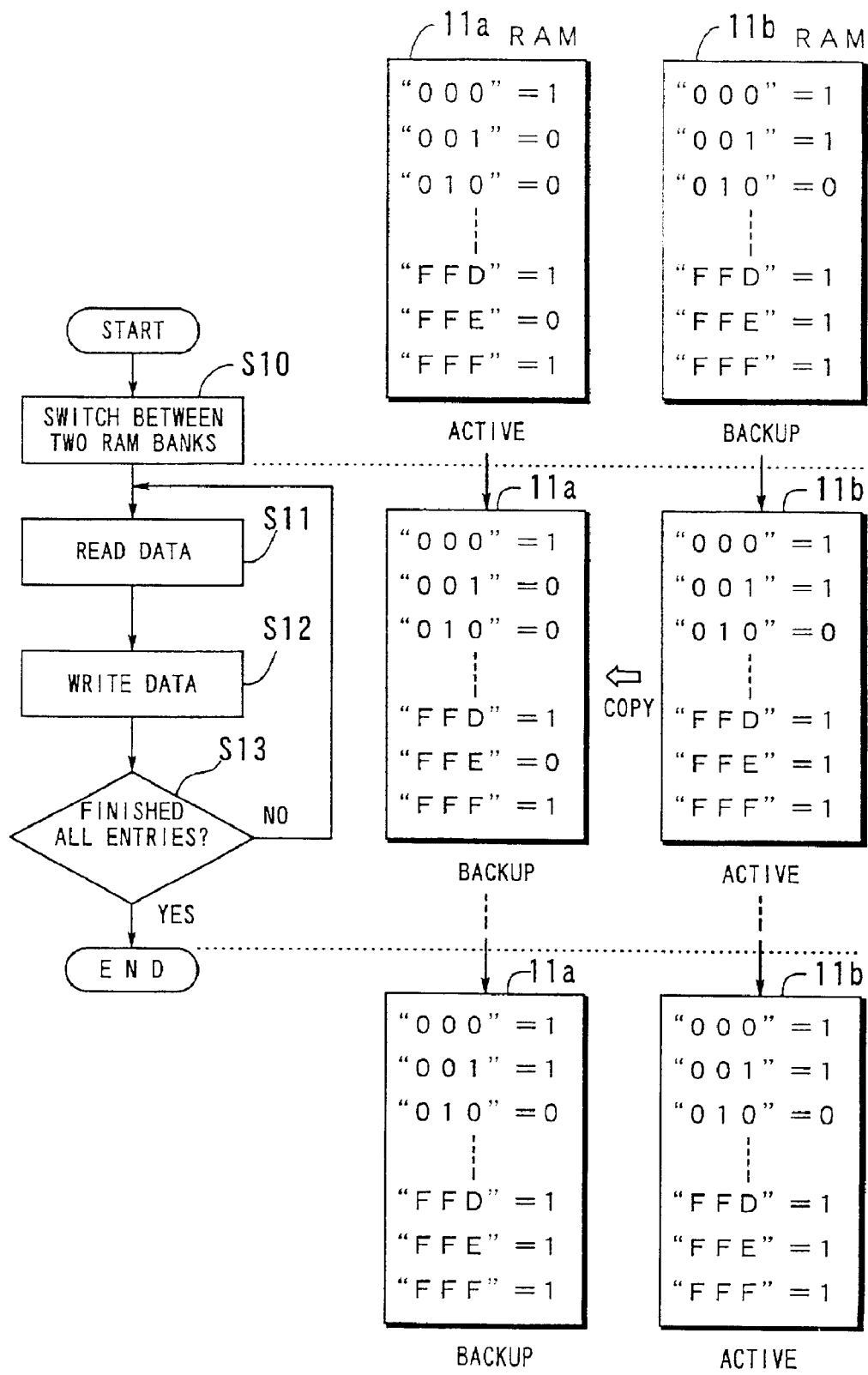
FIG. 5 is flowchart which shows a parameter copying operation.

The RAMs M11a and M11b are each equipped with two ports which allow simultaneous data read operations. For example, the active RAM can provide churned-VP parameters to the data dechurning unit 12, while sending data to the backup RAM for copying purposes. FIG. 5 is a flowchart showing this parameter copying operation. It is assumed here that the RAM M11a is initially assigned the active role, and the other RAM M11b the backup role. Their data contents are shown in FIG. 5, where the values on the left-hand side are VPIs and those on the right-hand side are their respective act bit values. For instance, the expression "000"=1 denotes that the RAM contains a churned-VP parameter that indicates the virtual path with a VPI value of "000" is churned (i.e., act bit a=1). The copying operation proceeds as follows.

(S10) At each churning key updating time point, the switching controller 11-3 switches between the two RAM banks, i.e., RAM M11a and RAM M11b.

(S11) The switching controller 11-3 informs the replication controller 11-4 of the churning key updating time point. In response to this, the replication controller 11-4 reads out one data entry from the active RAM M11b, incrementing the read address counter.

(S12) The replication controller 11-4 writes the read data entry to the backup RAM M11a, incrementing the write address counter.

(S13) The replication controller 11-4 tests whether the write address counter has reached its maximum address value. If it has not yet reached the maximum, the process returns to step S11 to repeat steps S11 and S12 for other data entries. If it is the maximum, the process exits from the copying routine.

Figure 6:
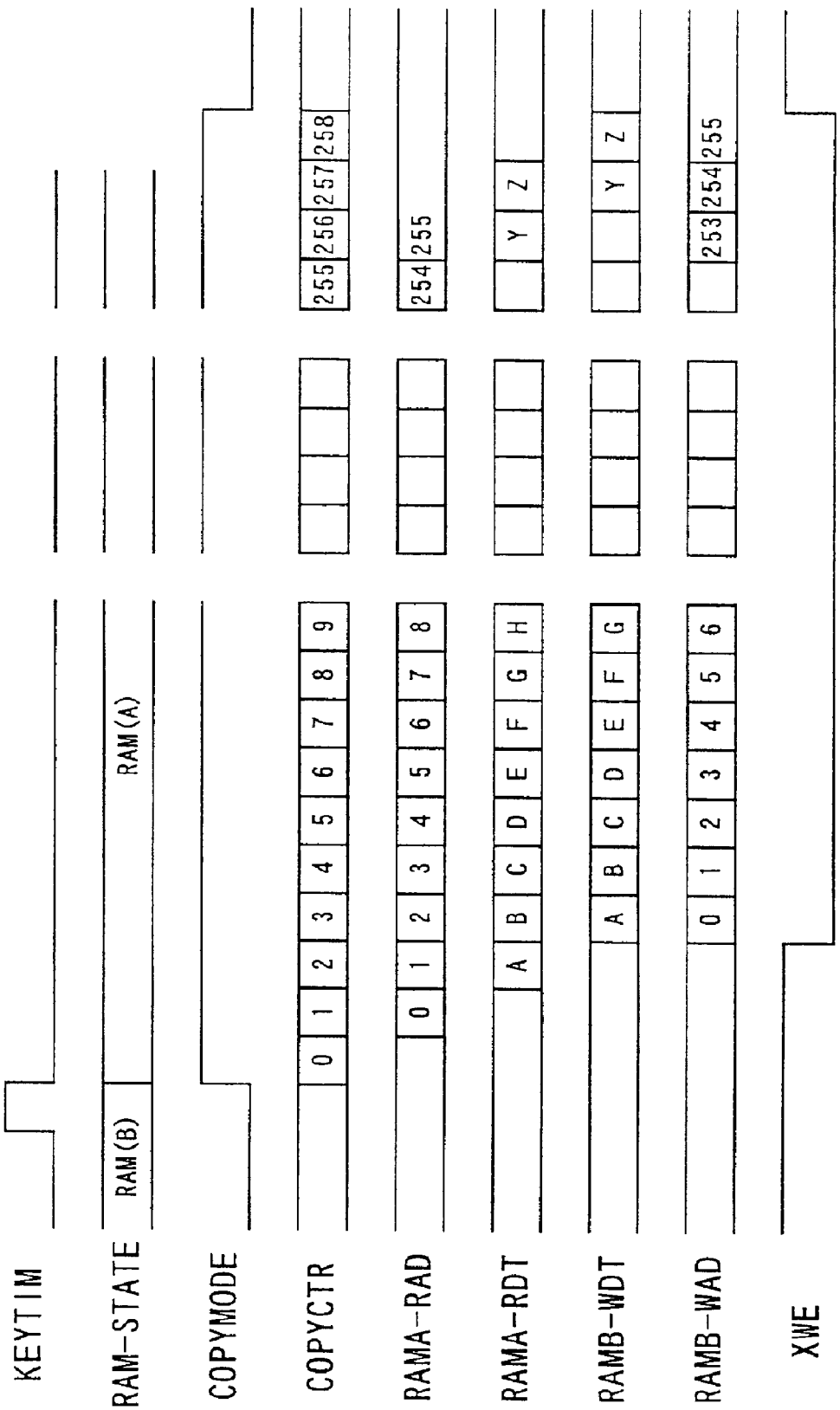
FIG. 6 is a timing diagram of the parameter copying operation.

FIG. 6 is a timing diagram which shows the sequence of the parameter copying operation in more detail. KEYTIM is a timing pulse signal that indicates churning key updating time points. RAM-STATE shows which of the two RAM banks is working as the active RAM currently. In the context of FIG. 6, the RAM(A) is activated at the shown churning key updating time point, while the RAM(B) was working as the active RAM before that time point. Note that RAM(A) and RAM(B) in FIG. 6 refer to the RAMs M11a and M11b in FIG. 4, respectively. COPYMODE, when it is high, indicates that the churning parameter memory subsystem 11 is copying its data contents from active RAM to backup RAM. COPYCTR is the output of a counter which increments the RAM address from zero to 256 while the COPYMODE signal is at a high level. This counter is actually a modulo 259 counter since the RAM write enable signal XWE (described more in a later part) has a phase lag as shown in FIG. 6.

RAMA-RAD is the read address of RAM(A), which has just been designated as the active RAM. This RAMA-RAD is produced by shifting COPYCTR by one unit interval of copying cycle, which is referred to hereafter as the "cycle time." RAMA-RDT shows a series of data words which are read out of the RAM(A) according to the sequential address signal RAMA-RAD. As seen from FIG. 6, the read data entries include: "A" for address "0," "B" for address "1," and so on. Note that RAMA-RDT follows RAMA-RAD with a delay of one cycle time.

RAMB-WDT, on the other hand, shows a series of data words to be written into RAM(B), which has just been switched to the backup RAM. This RAMB-WDT is produced by shifting RAMA-RDT by one cycle time. RAMB-WAD is the write address given to RAM(B) when writing RAMB-WDT to it. That is, the data "A" read out of RAM(A) is written to address "0" of RAM(B), data "B" to address "1" and so on. XWE is an active-low write enable signal which initiates a write operation to RAM(B), which has just been designated as the backup RAM, so as to copy the contents of RAM(A) to RAM(B).

In the way described above, the ONU of the present invention copies the latest churned-VP parameters from the active RAM to the backup RAM, each time the two RAM banks change their roles. This configuration permits the backup RAM to keep track of the latest churned-VP information, so that the memory content will be always consistent with what the OLT intends.

The next section will now describe how the proposed ONU will operate when it has received a new churned-VP parameter while a copying activity is in progress.

Since the ONU counts the number of frames by interpreting every PLOAM cycle as one frame unit, the churning key updating time point always occurs right at the time point of PLOAM cell reception. The PLOAM cell received at this churning key updating time point may contain churned-VP information. The ONU, however, cannot write the information to its backup RAM immediately, because parameter copying operations have already started and the backup RAM is receiving data from the active RAM. To properly update the backup RAM with the newly given information, the proposed ONU uses a flag indicating that a parameter copying operation is in progress. If a churned-VP message is received while this flag is set, the ONU waits until the flag is cleared at the end of the parameter copying operation, and then writes the received churned-VP parameter to the backup RAM. Actually, the aforementioned COPYMODE signal serves as a flag for this purpose.

Figure 7:
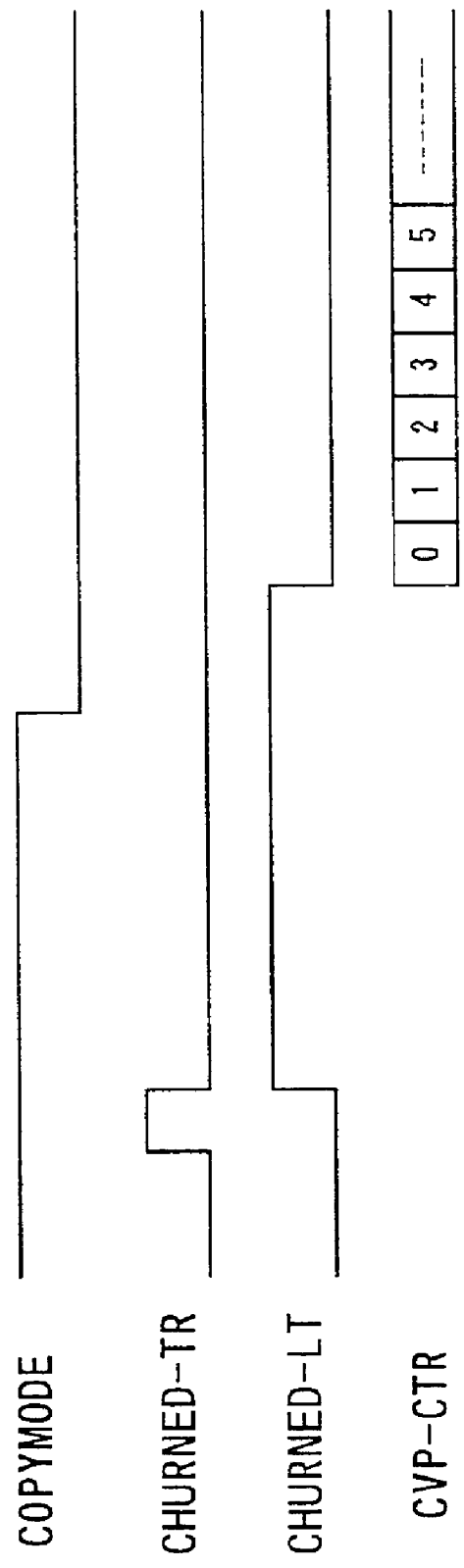
FIG. 7 is a timing diagram which shows the operation when a churned-VP message is received during a parameter copying operation.

FIG. 7 is a timing diagram which shows how the proposed ONU will operate when it receive a churned-VP message during a parameter copying operation. COPYMODE is set to "H" (high level) during a parameter copying operation. CHURNED-TR is a trigger signal that becomes "H" when a churned-VP message is received. CHURNED-LT is then produced by latching the CHURNED-TR signal when it becomes "H" while COPYMODE is "H." This CHURNED-LT is reset to "L" (low level) when the parameter copying operation is finished. At the falling edge of CHURNED-LT, CVP-CTR is loaded to provide a backup RAM write address.

As described above, the proposed ONU is configured to temporarily hold new churned-VP information received during a parameter copying operation, and not to write it to the backup RAM until that operation is finished. That is, the proposed ONU performs a parameter copying operation first and then overwrites the copied data with newly received churned-VP parameters. This prioritization ensures that the backup RAM will be properly updated with new information.

The next section will explain how the proposed ONU returns an acknowledge message in response to a churned-VP message.

The ITU-T Recommendation G.983.1 requires ONUs to send back an acknowledge message to notify the OLT of the correct reception of a churned-VP message. G.983.1, however, does not provide specific conditions for returning acknowledgment. According to the present invention, the ONU 10 returns an acknowledge message to the OLT, only when the churning parameter memory subsystem 11 can successfully verify the churned-VP parameters that have been written into the RAM. This verification is done by re-reading the data and comparing it with the original data that has been written.

Figure 8:
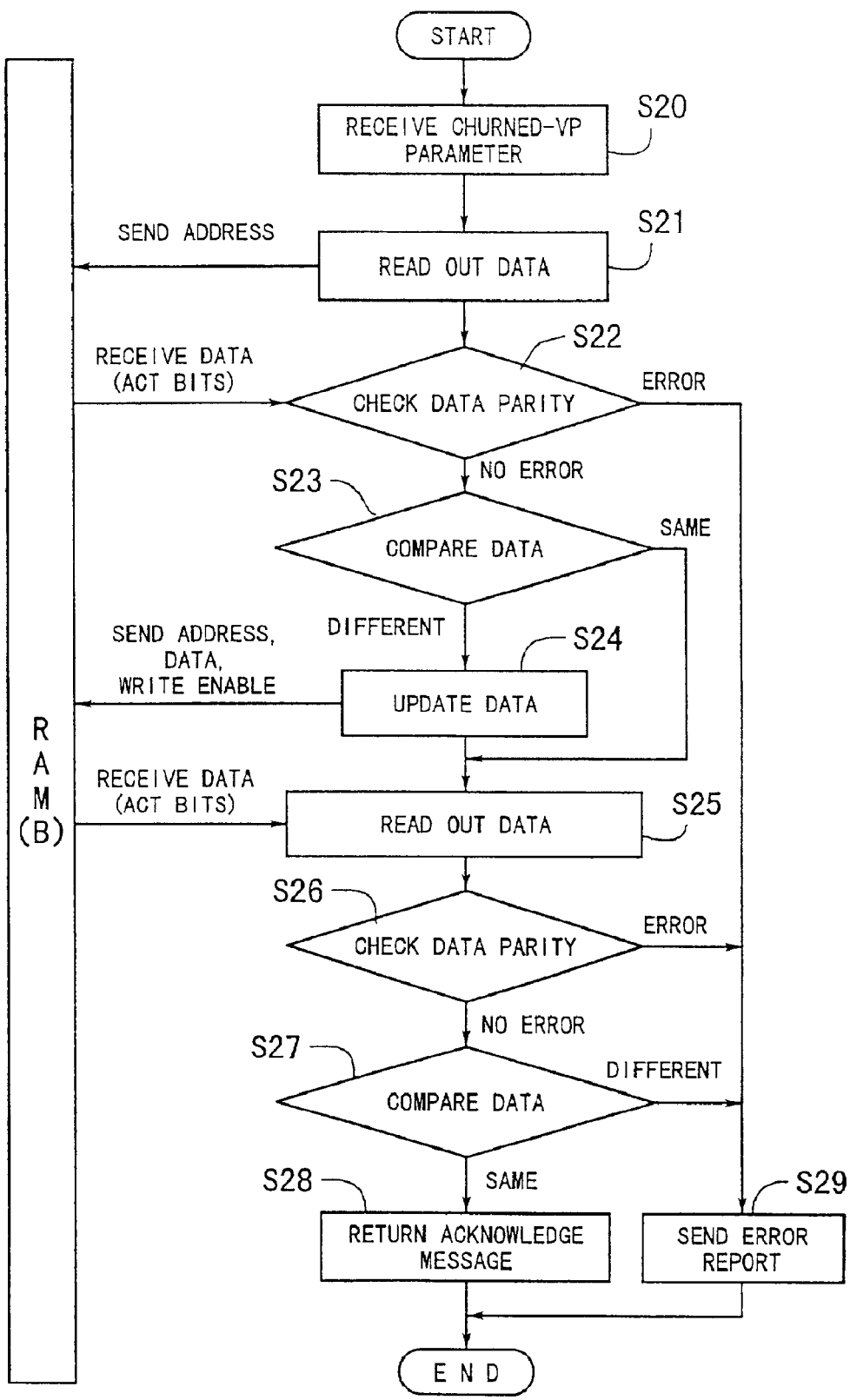
FIG. 8 is a flowchart which shows a process of sending back an acknowledge message.

FIG. 8 is a flowchart which shows a process of sending back an acknowledge message. It is assumed here that RAM(A) is serving as the active RAM, and RAM(B) as the backup RAM, and that the data has already been copied from RAM(A) to RAM(B). When a churned-VP message is received in this context, the ONU writes the information to RAM(B) and then sending back an acknowledge message after reading out the information again from RAM(B) for verification. This process comprises the following steps.

(S20) The ONU receives a churned-VP message.

(S21) The ONU reads data out of an address of RAM(B) that is specified by the received churned-VP message. That is, VPI(11:4) is supplied to RAM(B) as its read address, thereby reading out a relevant data word. By extracting one bit specified by VPI(3:0), the act bit information is obtained from the data word.

(S22) The ONU performs a parity check for the data word read out of RAM(B). Here, an error check and correction mechanism is employed to ensure more reliable data transport between LSI devices, for example. This is accomplished by adding an error correction code to each data to be transmitted. If no errors are detected, the process advances to step S23. If an unrecoverable parity error is detected, the process branches to step S29.

(S23) The ONU compares the read data of RAM(B) with the act bit information found in the received churned-VP message. If they do not agree, the process advances to step S24. If they have the same value, the process skips to step S25.

(S24) The ONU writes the updated act bit information to the same address as it made access at step S21.

(S25) The ONU re-reads the data from the same address.

(S26) The ONU performs a parity check for the data word read out of RAM(B). If no errors are found, the process goes to step S27. If an unrecoverable parity error is detected, the process branches to step S29.

(S27) The ONU compares again the data read out of RAM(B) with the act bit information found in the received churned-VP message. If they agree with each other, the process advances to step S28. If they do not agree, the process proceeds to step S29.

(S28) Now that the information has successfully been written into RAM(B), the ONU sends back an acknowledge message to notify the OLT of the correct reception of the churned-VP message.

(S29) The detected error is reported to a controller that controls the entire system of the ONU 10.

In this way, the churning parameter memory subsystem 11 of the present invention performs a write verification of each churned-VP parameter when it is received from the OLT and written into RAM. The ONU 10 returns an acknowledge message to the OLT, only when the written data is successfully verified. This feature of the invention prevents the stored churned-VP parameters from becoming inconsistent with that in the OLT.

Referring back to FIG. 1, the external storage controller 13 will be described below. The proposed ONU 10 is equipped with a backup power supply which will work in case of a main power failure, and with this backup power supply, the external storage controller 13 saves the current churned-VP parameters into a non-volatile memory 13a such as flash memory devices. This feature permits the ONU to recover by itself without requesting the OLT to resend churned-VP parameters after rebooting, since the necessary information is safely stored in the non-volatile memory 13a.

Once the current churned-VP parameters are saved, the external storage controller 13 selectively updates the entries of the non-volatile memory 13a with newly arrived churned-VP parameters, if it is different from the currently stored information. More specifically, when some act bit information is written at step S24 in the flowchart of FIG. 8, the churning parameter memory subsystem 11 sets its corresponding update flag indicating that the act bit information has been updated. Referring to this update flag as an enabling condition, the external storage controller 13 reads out data from its relevant address of the backup RAM and saves it the non-volatile memory 13a. In this way, the non-volatile memory 13a is updated efficiently by writing only the changed entries.

Generally, most memory devices for use as the non-volatile memory 13a are limited in terms of the number of programming cycles, which necessitates further efforts to reduce the frequency of data write operations that the external storage controller 13 may execute. To this end, the external storage controller 13 may be configured to store the churned-VP parameters to, for example, an SRAM (Static RAM) device when the system is rebooted, and transfer the data back to the non-volatile memory 13a when the ONU 10 is shut down. This configuration will effectively reduce the access to the non-volatile memory 13a. After the initial transfer of churned-VP parameters from the non-volatile memory 13a to the SRAM (not shown), the external storage controller 13 only has to selectively update the SRAM contents with such churned-VP parameters whose corresponding update flag is set. When the ONU 10 is shut down, the external storage controller 13 may transport only the changed churned-VP parameters to the non-volatile memory 13a, rather than transferring all the SRAM contents.

Figure 9:
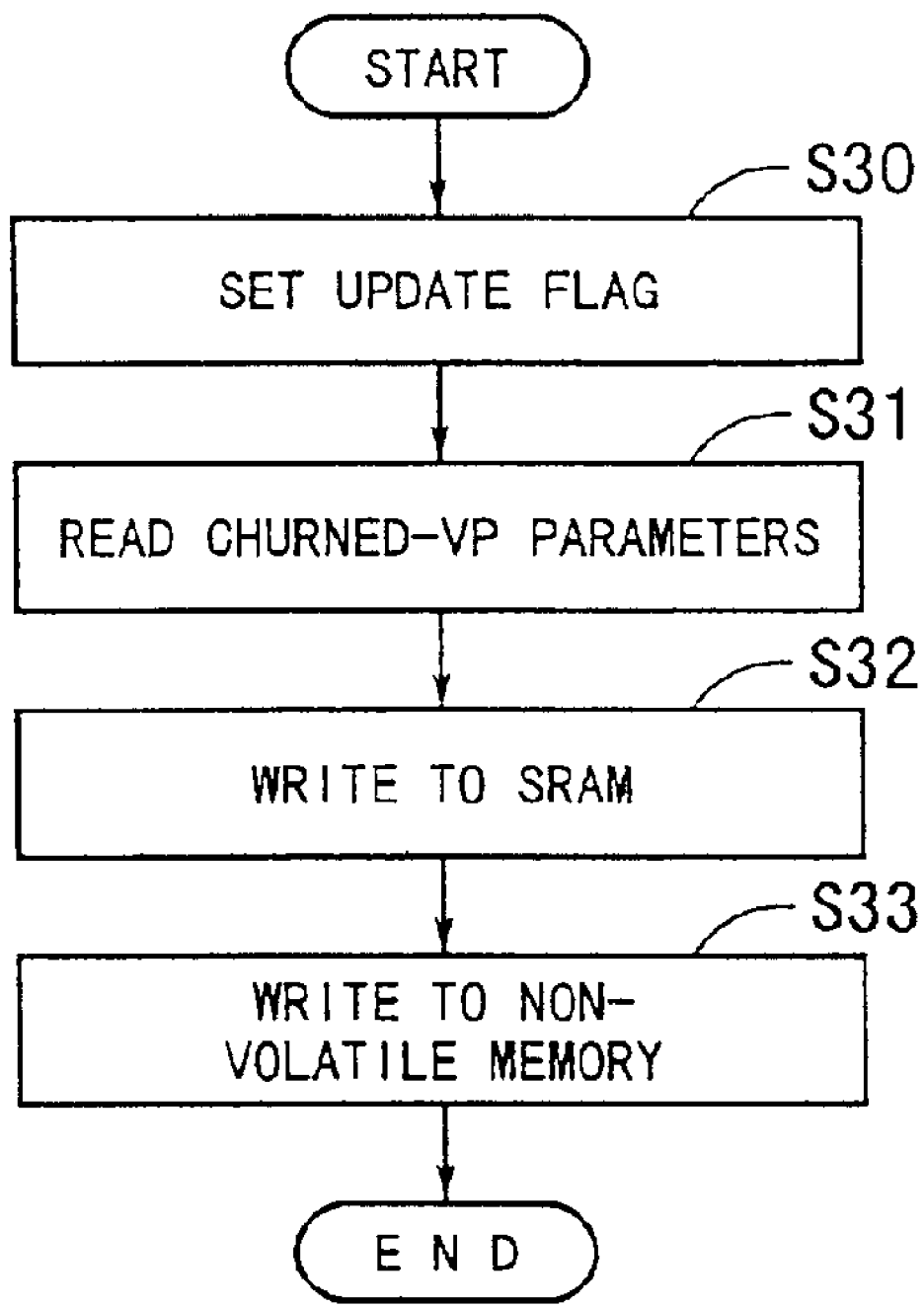
FIG. 9 is a flowchart which shows a process of copying updated churned-VP parameters from SRAM to non-volatile memory.

FIG. 9 is a flowchart which shows a process of copying updated churned-VP parameters from the SRAM to the non-volatile memory 13e. This process comprises the following steps.

(S30) The churning parameter memory subsystem 11 sets update flags corresponding to specific churned-VP parameters when they are changed.

(S31) According to the update flags being set, the external storage controller 13 reads out their relevant churned-VP parameters from the backup RAM.

(S32) The external storage controller 13 writes the changed churned-VP parameters into the SRAM.

(S33) When the ONU 10 is shut down, the external storage controller 13 transfers the SRAM contents to the non-volatile memory 13a.

As an alternative action at step S33, the external storage controller 13 may transport only the changed churned-VP parameters to the non-volatile memory 13a, rather than transferring all the SRAM contents, when the ONU 10 is shut down. This configuration will reduce the access to the non-volatile memory 13e more effectively.

When the main power is restored, the ONU 10 will operate as follows. The ITU-T Recommendation G.983.1 defines ten states of the ONUs, which are referred to as O1 to O10, and more particularly, it requires that the ONUs be in state O1 or O9 after the main power is restored. Here, state O1 is the initial state of an ONU after power-up, while state O9 denotes the emergency stop state. Once the ONU enters the Emergency stop state, it cannot communicate with the OLT, being disconnected from the network.

According to the present invention, the proposed ONU 10 has another state with a symbol "O0," which represents the state just after power-up. This newly defined state O0 means an initial preparation state in which the ONU determines whether to go to O1 or O9. The churning parameter memory subsystem 11 of the present invention is designed to accept churned-VP parameters from the non-volatile memory 13a, only when the ONU is in this state O0 after power-up. Even if some external event changed the RAM while the ONU 10 was in the operating state (i.e., state O8), the above mechanism would not activate that information. Thus the churned-VP parameters in the ONU 10 will be kept consistent with those in the OLT.

The churning parameter memory subsystem 11, on the other hand, can determine its initial data source in state O0, choosing either of the churned-VP parameters read out of the non-volatile memory 13a or those that newly received from the OLT. In other words, the ONU is offered a choice of whether to enable or disable the churned-VP parameters that was reloaded from the non-volatile memory 13a during the O0 state. This is because it is sometimes preferable for the ONU 10 to use churned-VP parameters resent from the OLT. To support those two options in state O0, the proposed ONU configures the churning parameter memory subsystem 11 in such a way that one of its two RAM banks keeps the values loaded from the non-volatile memory 13a, while the other RAM bank is initialized so that all the entries will be set to the "Not churned" state. The ONU 10 provides a flag to indicate which RAM bank should be activated. This flag, referred to herein as the "enable external memory flag," will be set when the ONU 10 intends to use the values loaded from the non-volatile memory 13a. In this case, the values loaded to the RAM are subjected to later updates, being overwritten with incoming churned-VP parameters. When the enable external memory flag is cleared, new churned-VP parameters sent from the OLT will be written into the RAM that has been initialized to the "Not churned" state. In both cases, the aforementioned parameter copying operation begins at a churning key updating time point.

Figure 10:
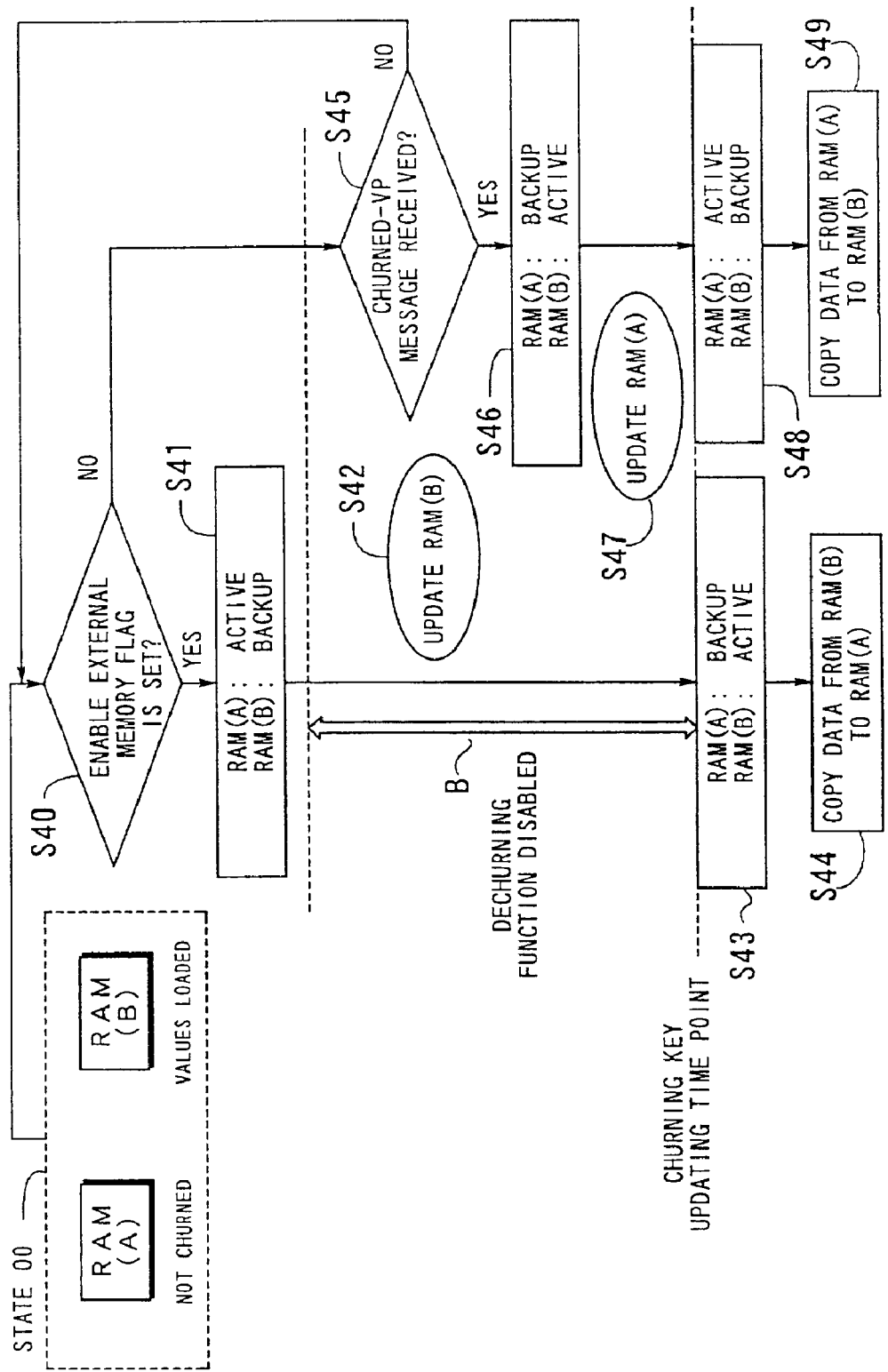
FIG. 10 is a flowchart which shows how the churning parameter memory subsystem operates when the power is restored.

FIG. 10 is a flowchart which shows how the churning parameter memory subsystem 11 operates when the main power is restored. It is assumed now that all the RAM(A) entries have been initialized to the "Not churned" state, and also that RAM(B) has been loaded with the churned-VP parameters copied from the non-volatile memory 13a. It is further assumed that user cells are not churned during a period "B." In such a situation, the churning parameter memory subsystem 11 operates according to the following steps.

(S40) It is tested whether the enable external memory flag is set. If the flag is set, the process advances to step S41. If not, the process branches to step S45.

(S41) The churning parameter memory subsystem 11 designates RAM(A) as the active RAM, and RAM(B) as the backup RAM.

(S42) Each time a churned-VP message is received, a relevant entry in RAM(B) is overwritten with the received parameter.

(S43) At a churning key updating time point, the churning parameter memory subsystem 11 designates RAM(A) as the backup RAM, and RAM(B) as the active RAM.

(S44) The contents of RAM(B) is copied to RAM(A).

(S45) If a churned-VP message is received, the process advances to step S46. If not, the process returns to step S40.

(S46) The churning parameter memory subsystem 11 designates RAM(A) as the backup RAM, and RAM(B) as the active RAM.

(S47) Each time a churned-VP message arrives, the relevant entry in RAM(A) is overwritten with the received parameter.

(S48) At a churning key updating time point, the churning parameter memory subsystem 11 designates RAM(A) as the active RAM, and RAM(B) as the backup RAM.

(S49) The contents of RAM(A) is copied to RAM(B).

Figure 11:
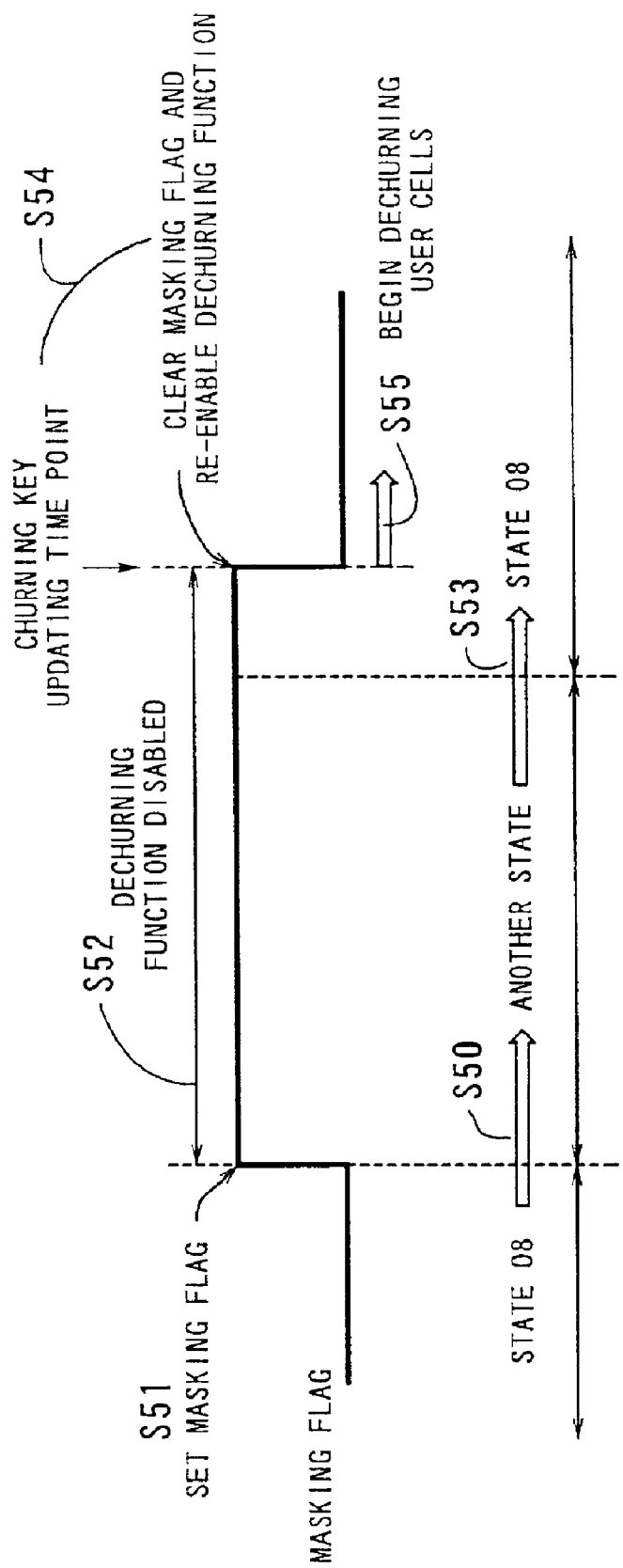
FIG. 11 is a diagram which shows a process to disable data dechurning tasks.

Referring now to FIG. 11, the dechurning mask unit 14 operates as follows. The ONU 10 is designed to begin dechurning of incoming user cells when it enters the operating state O8. However, in the case that the ONU 10 comes back to O8 after a transition from O8 to any other state, if the churning key of the ONU 10 happened to be different from what the OLT thinks it should be, the ONU 10 could erroneously apply a dechurning operation to user cells. It is therefore necessary for the ONU 10 to mask, or disable, the dechurning function during the above transition period, and FIG. 11 shows how to perform this. The process proceeds according to the following steps.

(S50) The ONU 10 changes from the operating state O8 to another state.

(S51) In response to the state transition, the dechurning mask unit 14 sets a masking flag.

(S52) The dechurning mask unit 14 then disables the dechurning function of the ONU 10.

(S53) The ONU 10 returns to the operating state O8.

(S54) The dechurning mask unit 14 waits for the first churning key updating time point after the ONU 10 has entering to O8. When that time point is reached, it clears the masking flag to enable again the dechurning function.

(S55) The ONU 10 begins dechurning incoming user cells on the basis of the new churning key and new churned-VP parameters.

In the way described above, the dechurning mask unit 14 is designed to disable the data dechurning function during the period between a transition to O8 and its subsequent churning key updating time point, outputting given user cells just as they are. This prevents the ONU from erroneously dechurning user cells, since the data dechurning function will not become effective until the OLT and ONU 10 can ensure their use of the same churning key.

Figure 12:
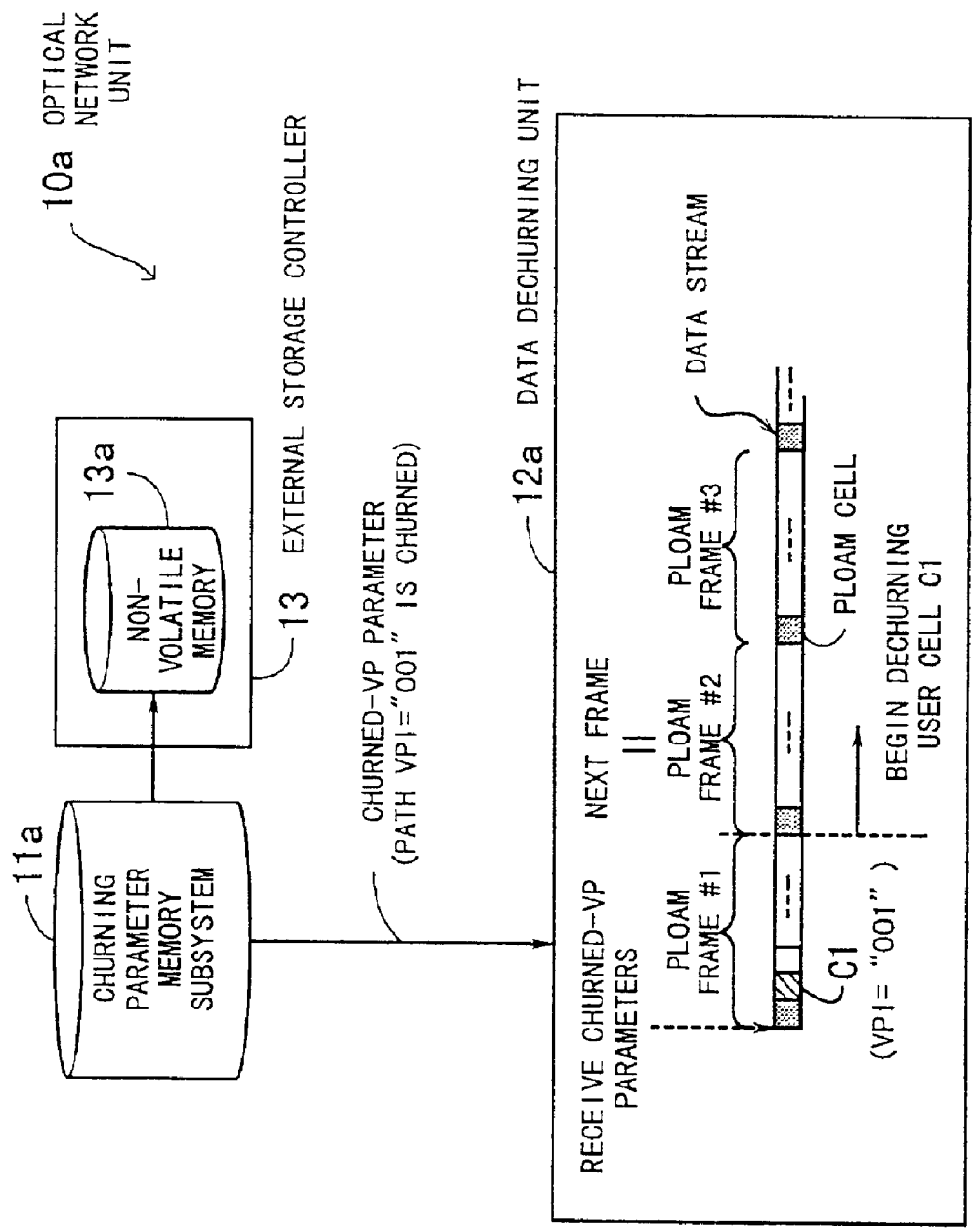
FIG. 12 is a diagram which shows a variant of the proposed ONU.

While the above sections have described a preferred embodiment of the present invention, it is not intended to limit the invention to that specific structure. FIG. 12 shows an optical network unit 10a, an alternative implementation of the ONU 10. While this ONU 10a of FIG. 12 has an external storage controller 13, its specifics will not be explained here again since they can be found in an earlier section.

According to this alternative implementation, a churning parameter memory subsystem 11a has only a single storage area for storing churned-VP parameters. A data dechurning unit 12a receives a data stream consisting of a plurality of frames and dechurns it according to the churned-VP parameters stored in the churning parameter memory subsystem 11a. When a new churned-VP message is received in a certain frame, the data dechurning unit 12a will activate the received parameter at the beginning of the next frame. Then the data dechurning unit 12a uses the churned-VP parameter to dechurn the incoming data streams in that frame and later.

It is assumed, for example, that there is a churned-VP message which contains a churning parameter indicating that a virtual path with VPI="001" (in hexadecimal notation) is churned, among other virtual paths within each frame of the data stream. It is also assumed that the user cell C1 in each frame has a VPI with a value of "001" in its overhead section. When the above churning parameter arrives at the ONU 10a in PLOAM frame #1, the data dechurning unit 12a activates the churned-VP parameter in the subsequent PLOAM frame #2 after reading out the churned-VP parameter from the churning parameter memory subsystem 11a. That is, the dechurning of the user cell C1 begins in PLOAM frame #2.

As seen from the above, the ONU 10a differs from the ONU 10 in that it needs only one storage space, and in that it activates a new churned-VP parameter independently of the update timing of churning keys. This single memory structure permits the ONU 10a to decode user cells in a more efficient manner.

Figure 13:
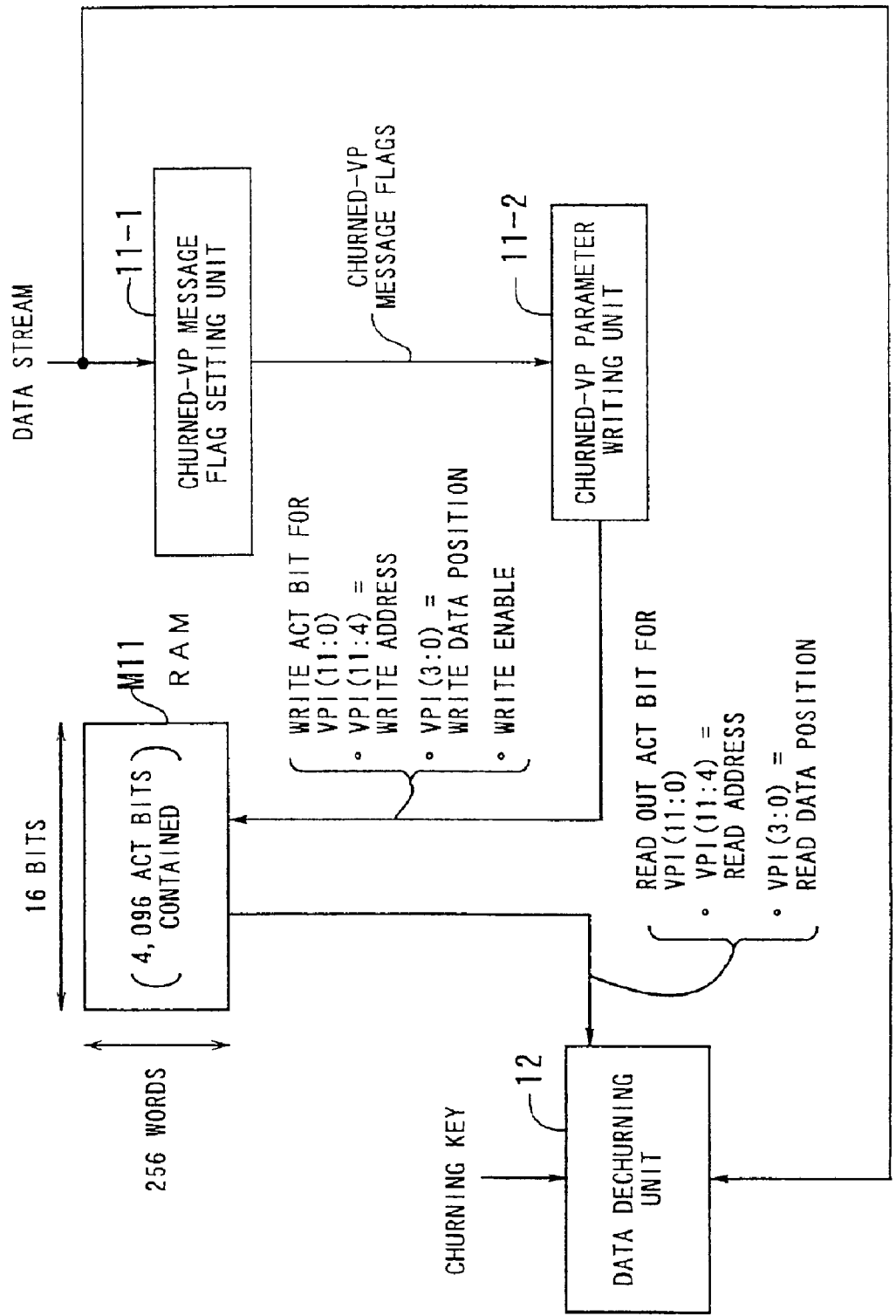
FIG. 13 is a block diagram which shows a mechanism to realize a data dechurning operation in a subsequent frame.

FIG. 13 is a block diagram which shows a mechanism to realize a data dechurning operation in a subsequent frame. This mechanism comprises a RAM M11, a churned-VP message flag setting unit 11-1, and a churned-VP parameter writing unit 11-2, which are components of the churning parameter memory subsystem 11a in FIG. 12. The data dechurning unit 12a in FIG. 12 is shown as a data dechurning unit 12 in FIG. 13.

When a churned-VP message is found in a received PLOAM cell, the churned-VP message flag setting unit 11-1 sets a relevant churned-VP message flag. The churned-VP parameter writing unit 11-2 writes the received churned-VP parameter to the RAM M11, controlling its write enable input according to the churned-VP message flag. The RAM M11 is organized as a 16-bit×256-word memory. When a churned-VP message containing a specific VPI and its act bit status is received, the RAM M11 is addressed by VPI(11:4) out of the received 12-bit VPI(11:0), and the act bit status is written into one of the sixteen data bits as specified by VPI(3:0). In this way, the RAM M11 provides storage space for 4096 instances of the act bit information.

The data dechurning unit 12 receives an incoming data stream, extracting a VPI(11:0) value from each user cell in the stream. The data dechurning unit 12 supplies the RAM M11 with VPI(11:4) out of the extracted VPI(11:0) as its read address, thereby reading out a data word containing sixteen act bits. By choosing one bit as specified by VPI (3:0), the act bit information relevant to the user cell is obtained. If a=1 (i.e., the act bit is "1"), the data dechurning unit 12 dechurns the cell by using an appropriate churning key. If a=0, the data dechurning unit 12 outputs the cell as it is, without dechurning its data part.

Figure 14:
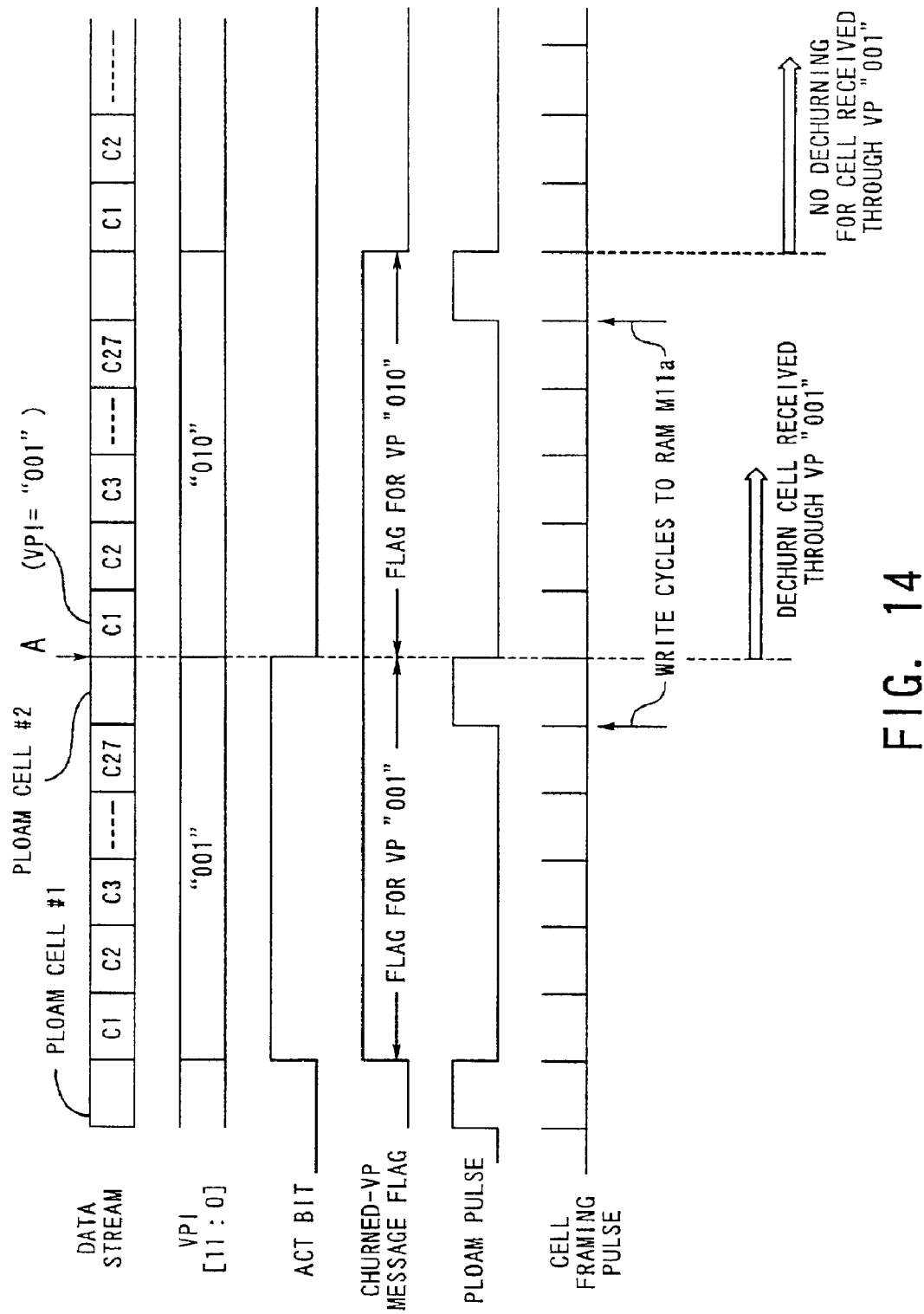
FIG. 14 is a timing diagram which shows how data dechurning is performed in a subsequent frame.

FIG. 14 is a timing diagram which shows how the incoming information is dechurned, assuming that a PLOAM cell #1 in the data stream contains a churned-VP message that says the virtual path with a VPI(11:0) value of "001" (in hexadecimal notation) is churned (i.e., its act bit is "1"). When this PLOAM cell #1 is received, the churned-VP message flag setting unit 11-1 recognizes it as a churned-VP message by detecting its message identification in byte #41. Upon recognition, it outputs a relevant churned-VP message flag as shown in FIG. 14. On the other hand, the churned-VP parameter writing unit 11-2 internally holds the received VPI(11:0)="001" and act bit information (a=1) until it detects the first user cell C1 in the next frame. Referring to FIG. 14, PLOAM pulses indicate the position of each PLOAM cell, while cell framing pulses define the beginning of individual cells. The write enable signal for the RAM M11 is created through a logical AND operation of the churned-VP message flag and PLOAM pulses. Using this write enable signal, together with the cell framing pulses as the write timing signal, the churned-VP parameter writing unit 11-2 performs a RAM write operation. During this operation, VPI(11:4)="00" is supplied to the RAM M11 as its write address, and VPI(3:0)="1" specifies the bit position of the write data, so that the act bit information will be written to the specified bit in the RAM M11.

As a result of the above, the churned-VP parameter given by the PLOAM cell #1 is written into the RAM M11 at the beginning of the PLOAM cell #2 in the next frame. After that (from the time point "A" in FIG. 14, at which the first user cell C1 begins in the next frame), the data dechurning unit 12 reads out this information from the RAM M11 each time a cell with a VPI(11:0) value of "001" is received, and dechurns the cell accordingly. In the present example, the data dechurning unit 12 dechurns the cell C1 just after the time point "A," since the cell C1 has a VPI(11:0) value of "001."

Suppose, on the other hand, that the next PLOAM cell #2 in the data stream contains a churned-VP message that says the virtual path with a VPI(11:0) value of "010" is not churned (i.e. a=0). In this case, every incoming cell having this VPI value "010" will be handled as it is, without being dechurned, according to the timing diagram of FIG. 14.

As described above, the proposed ONU 10a is designed to receive a new churned-VP parameter from the OLT in a PLOAM cell and activates it when the next PLOAM cell is received in the subsequent PLOAM frame. That is, the ONU 10a can start to dechurn the incoming user cells immediately from the next frame. This configuration reduces the latency of data received from the OLT, besides preventing inconsistencies from being introduced between the data churning process at the OLT and the data dechurning process at the ONU 10a.

Referring next to FIGS. 15 to 24, an optical line terminal (OLT) according to the present invention will now be described below.

Figure 15:
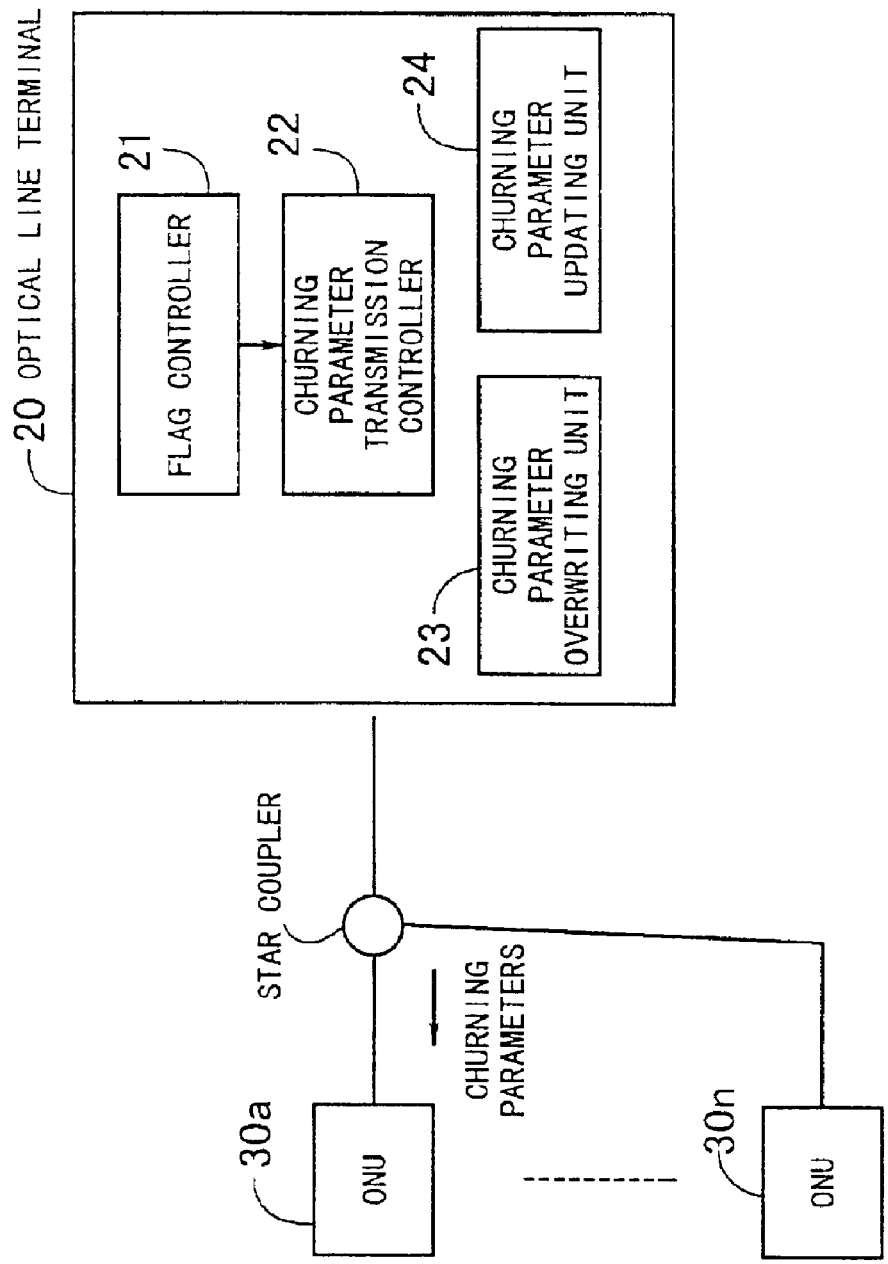
FIG. 15 is a conceptual view of an optical line terminal according to the present invention.

FIG. 15 is a conceptual view of an optical line terminal 20 according to the present invention. Being coupled to an optical access network system (e.g., ATM-PON), this OLT 20 transmits a data stream to a plurality of optical network units 30a to 30n (or ONUs 30, collectively). Here, the data stream contains information encrypted by using a churning key.

The OLT 20 comprises a flag controller 21, a churning parameter transmission controller 22, a churning parameter overwriting unit 23, and a churning parameter updating unit 24. When sending a data stream, the flag controller 21 sets and clears various flag, according to the status of the ONUs 30. Based on the flags, the churning parameter transmission controller 22 controls transmission of churning parameters (i.e., churned-VP parameters) which indicate which logical connections are churned or not. The churning parameter overwriting unit 23 resends churned-VP parameters to ONUs 30, allowing them to overwrite their own information bases. The churning parameter updating unit 24 controls the update time points of churned-VP parameters so that they will be synchronized with the end of each churning key updating operation.

The flags mentioned above include an "initial parameter delivered flag," which is controlled by the flag controller 21 as follows. The OLT 20 sends churned-VP parameters to the ONU 30a when the ONU 30a has changed from a standby state to the operating state 08. Such a churned-VP transmission triggered by a state transition from idle to O8 is called the "initial parameter delivery process." For use in this initial parameter delivery process, the flag controller 21 provides an "initial parameter delivered flag" for each individual ONU. More specifically, the flag controller 21 clears the flag to "0" when the ONU 30 is in the standby state, while it sets the flag to "1" when the initial parameter delivery process is finished. When the ONU 30 enters to state O8, the churning parameter transmission controller 22 checks the initial parameter delivered flag, and if the flag is still cleared at that time, it executes an initial parameter delivery process.

Figure 16:
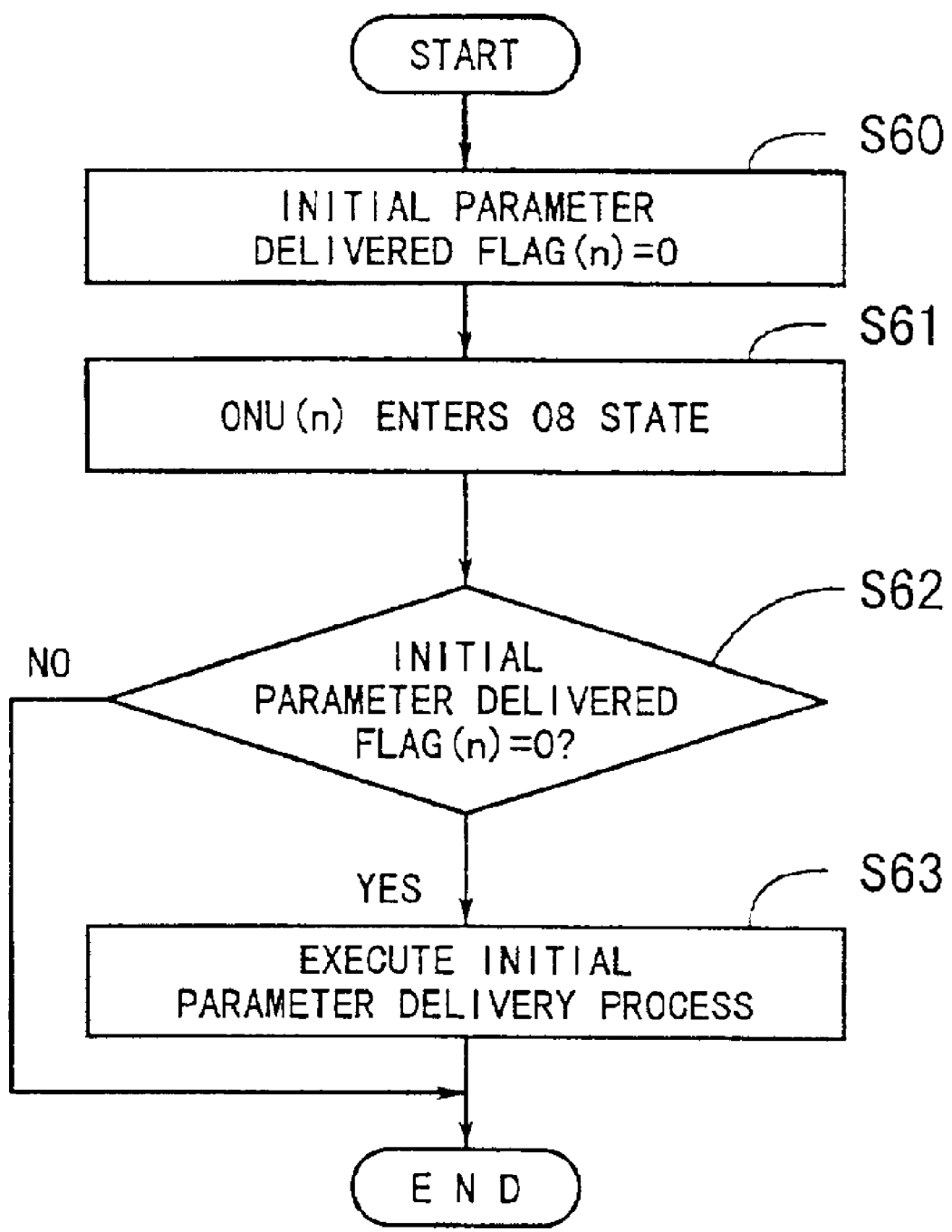
FIG. 16 is a flowchart which shows an initial parameter delivery process using an initial parameter delivered flag.

FIG. 16 is a flowchart showing the initial parameter delivery process using the initial parameter delivered flag. As a presupposition, note that every ONU has its own identifier n; the state of individual ONUs and their respective flags (described later) are referred to by their identifiers n.

(S60) The flag controller 21 clears the initial parameter delivered flag(n) to "0" when each ONU(n) is in the standby state.

(S61) Suppose that a specific ONU(n) changes from the standby state to state O8.

(S62) Upon detection of the transition of the ONU(n) to state O8, the flag controller 21 checks whether its corresponding initial parameter delivered flag(n) is "0." If the flag is "0," then the process advances to step S63. If the flag is "1," the process terminates, since the flag indicates that the initial parameter delivery process has already been done.

(S63) The churning parameter transmission controller 22 executes an initial parameter delivery process for the ONU(n). More specifically, the churning parameter transmission controller 22 supplies the ONU(n) with churned-VP parameters for 4096 virtual paths. In response to each churned-VP message, the ONU(n) returns an acknowledge message to inform the sender of the correct reception. The initial parameter delivery process is finished when all 4096 churned-VP messages are transmitted and the subsequent acknowledge messages are received. When this is finished, the churning parameter transmission controller 22 sets the initial parameter delivered flag(n) to "1" accordingly.

As described above, the proposed OLT 20 has an initial parameter delivered flag for each ONU, which is cleared when the ONU 30 is in the standby state and set when a relevant initial parameter delivery process is finished. With this flag, the OLT 20 executes an initial parameter delivery process only when the ONU 30 makes a transition from standby to O8. This means that the proposed OLT 20 will never waste the bandwidth by executing again the same process, being triggered by other kinds of state transitions.

The flag controller 21 further provides an "initial parameter sending flag," which is controlled and used as follows. The flag controller 21 sets this flag during the execution of an initial parameter delivery process for an ONU. When the initial parameter sending flag is set, the churning parameter transmission controller 22 stops accepting requests for an initial parameter delivery process. Suppose, for instance, that a plurality of ONUs left the standby state and have entered the operating state O8 simultaneously. In this case, the churning parameter transmission controller 22 serves for the requesting ONU that made such a transition first. The initial parameter sending flag is set at this time, which makes other ONUs wait until the current process is finished.

Figure 17:
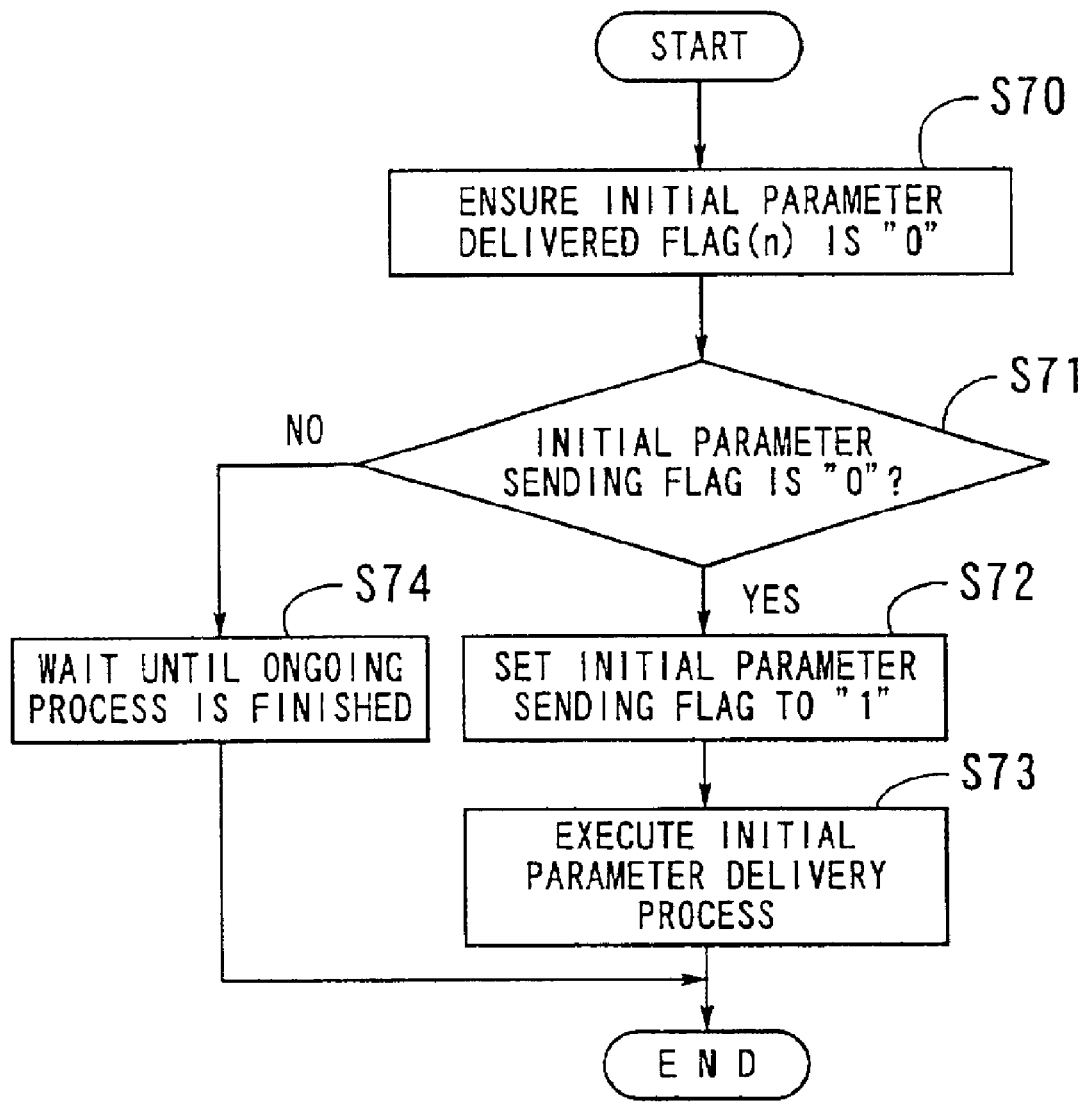
FIG. 17 is a flowchart which shows an initial parameter delivery process using an initial parameter sending flag.

FIG. 17 is a flowchart which shows the initial parameter delivery process using the initial parameter sending flag.

(S70) The flag controller 21 ensures that the initial parameter delivered flag(n) is "0."

(S71) The flag controller 21 tests whether the initial parameter sending flag is "0." If the flag is "0," the process advances to step S72. If the flag is "1," the process advances to step S74.

(S72) The flag controller 21 sets the initial parameter sending flag to "1" because no other ONUs are being served.

(S73) The churning parameter transmission controller 22 performs an initial parameter delivery process for the requesting ONU(n).

(S74) The churning parameter transmission controller 22 waits until the initial parameter sending flag returns to "0" (i.e., until the ongoing initial parameter delivery process is finished).

In the way described above, the proposed OLT 20 performs the initial parameter delivery process for a specific ONU only when the initial parameter sending flag is zero. This means that the next ONU cannot be served until the ongoing process is finished. Therefore, even if a plurality of ONUs simultaneously request the OLT to execute the process, the OLT can serially handle those requests, serving one ONU at a time. That is, the OLT can sends initial churned-VP messages efficiently, without the need for complicated congestion control.

The flag controller 21 further provides a "parameter update failure flag" as follows. Suppose here that a certain ONU 30 is in the operating state after the completion of its initial parameter delivery process. During this normal operation, the optical line terminal 20 sends churned-VP update messages to the ONU 30 or resends them for overwriting purposes. The receiving ONU 30, however, may fail to update or overwrite the churned-VP information for some reason, and thus returns no acknowledgement to the OLT 20. In the terminology of G.983.1, this kind of failure is known as the loss of acknowledge (LOAi), which would bring the ONU 30 back to the standby state. When the ONU 30 recovered from the failure and has successfully re-entered to the operating state O8, the OLT 20 has to execute the initial parameter delivery process again. To this end, the flag controller 21 provides a parameter update failure flag to indicate that the ONU 30 has failed to update churned-VP information during its normal operation. If this flag is set, the churning parameter transmission controller 22 understands that the ONU 30 has encountered some problem in processing churned-VP update messages, and thus it invokes again an initial parameter delivery process for this ONU 30.

Figure 18:
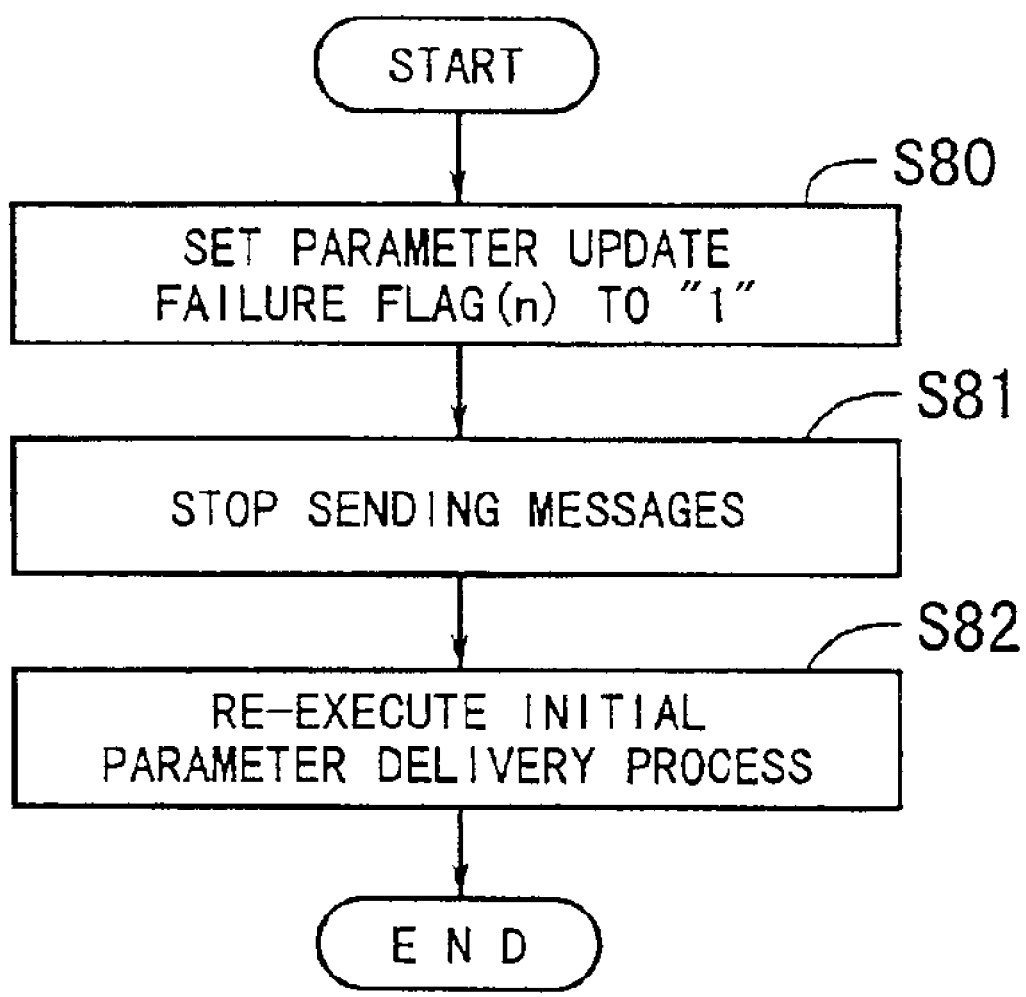
FIG. 18 is a flowchart which shows an initial parameter delivery process using a parameter update failure flag.

FIG. 18 is a flowchart which shows an initial parameter delivery process using the parameter update failure flag. Note here that the process of updating churned-VP information in an operating ONU is referred to hereafter as the "parameter updating process."

(S80) The flag controller 21 detects an update failure when the OLT 20 receives no acknowledge message from an ONU(n) within a period of 300 ms after sending the last churned-VP update message. Now it sets the relevant parameter update failure flag(n) to "1" accordingly.

(S81) The churning parameter transmission controller 22 stops sending messages to the failed ONU(n). The ONU(n) enters the standby state.

(S82) When the ONU(n), whose parameter update failure flag is set to "1," reenters to state O8, the churning parameter transmission controller 22 executes another initial parameter delivery process for this ONU(n).

In the way described above, the proposed OLT 20 is designed to re-execute an initial parameter delivery process, as well as setting a relevant parameter update failure flag, in the case that the ONU 30 has failed to update its churned-VP information. This additional execution of an initial parameter delivery process permits the failed ONU 30 to keep its stored churned-VP parameters consistent with those in the OLT 20.

The flag controller 21 further provides a "parameter update unfinished flag" for the following reason. Suppose again that a certain ONU 30 has finished its initial parameter delivery process and now it is in the operating state. However, the ONU 30 could be forced out of the operating state because of some reason other than the above-discussed update failure. In such cases, the ongoing churned-VP update operation is deemed to be unfinished. To address this problem, the flag controller 21 provides a parameter update unfinished flag to indicate that the ONU 30 has not finished to update some churned-VP parameters. When the ONU 30 enters to state O8 again, the churning parameter transmission controller 22 checks the parameter update unfinished flag, and if the flag is still set at that time, it will execute an initial parameter delivery process.

Figure 19:
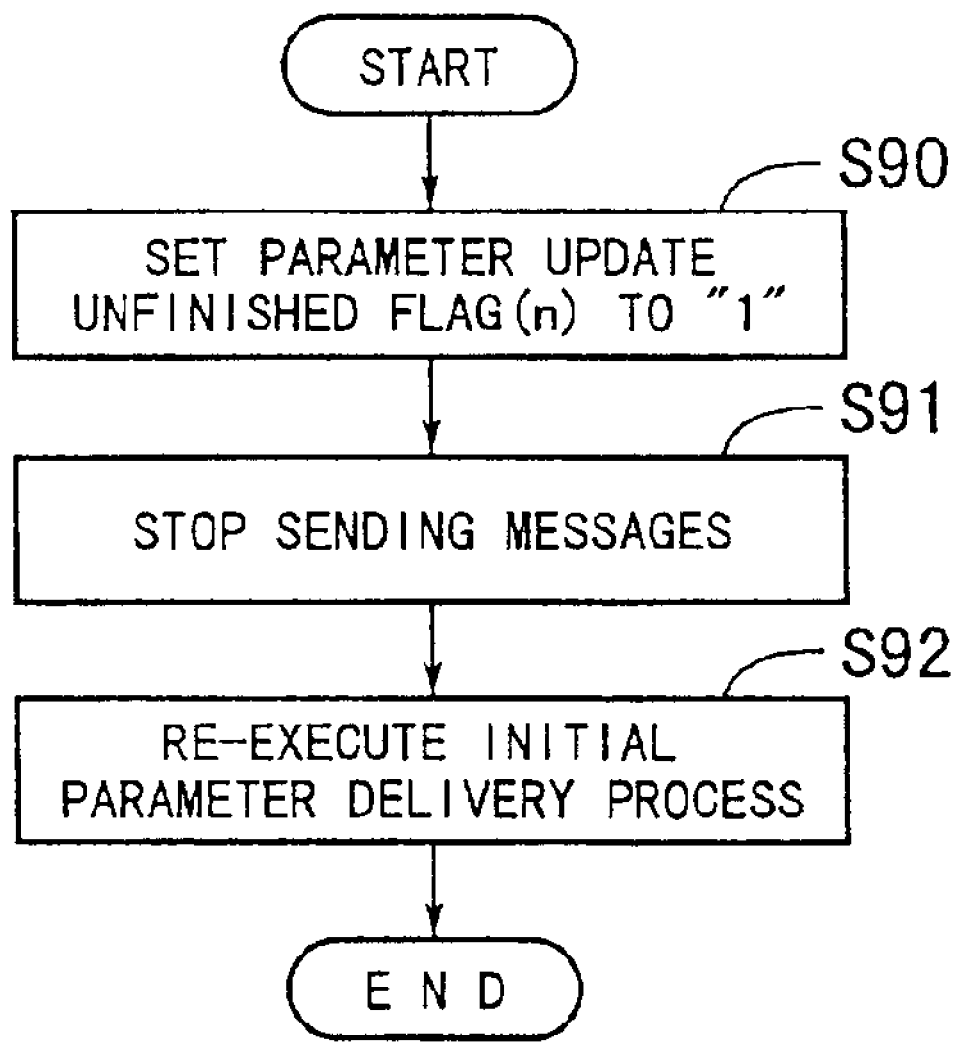
FIG. 19 is a flowchart which shows an initial parameter delivery process using a parameter update unfinished flag.

FIG. 19 is a flowchart which shows an initial parameter delivery process using the parameter update unfinished flag. This process proceeds according to the following steps.

(S90) When a specific ONU(n) has left the operating state O8, the flag controller 21 sets its corresponding parameter update unfinished flag(n) to (S91) The churning parameter transmission controller 22 stops sending further messages to the failed ONU(n). The ONU(n) now enters to the standby state.

(S92) When the ONU(n), whose parameter update unfinished flag is set to "1," re-enters to state O8, the churning parameter transmission controller 22 executes another initial parameter delivery process for this ONU (n).

In the way described above, the proposed OLT 20 is designed to re-execute an initial parameter delivery process, as well as setting a relevant parameter update unfinished flag, in the case that the ONU 30 left the operating state. This additional execution of an initial parameter delivery process permits the ONU 30 to keep its stored churned-VP parameters consistent with those in the OLT 20, in the case of a problem other than churned-VP update failures.

The flag controller 21 further provides a "churning key updating flag," which works as follows. As stated in an earlier section, the ONUs dynamically change their churning keys at prescribed intervals, thereby ensuring data confidentiality. However, if a parameter updating process or parameter overwriting process is performed during the period of this churning key updating process, the churned-VP parameters could not be correctly updated because of possible conflict between the two processes. To avoid this conflict, the flag controller 21 provides a churning key updating flag which is set during the period when a churning key updating process is under way.

When the churning key updating flag is set, the optical line terminal 20 cannot send any messages other than churning key update messages. If a certain ONU 30 requests the OLT 20 to update churned-VP information during this period, the OLT 20 holds the request until the churning key is updated. This feature permits the ONU 30 to keep its stored churned-VP parameters consistent with those in the OLT 20.

The flag controller 21 further provides a "parameter update request flag" for each ONU. This flag will be set by an external maintenance station, when the OLT 20 performs a parameter updating process for a specific ONU that has already finished an initial parameter delivery process. The OLT 20 then updates the requesting ONU's churned-VP parameters. Upon completion of the update, the parameter update request flag is cleared. In this way, the OLT 20 can modify the churned-VP parameters that have once been established through the past initial parameter delivery process, when the ONU of interest is in the operating state O8.

Note that the parameter update request flag is provided for each individual ONU, and that each ONU is allowed to update only one VPI entry at a time. In the case of VPI for broadcast traffic, all ONUs receive the same update. The above restriction of "one VPI entry per ONU" ensures that each parameter updating process can be finished within the interval of churning key updates, thus rendering the updating time deterministic.

The flag controller 21 further provides a "parameter updating flag" for each ONU. Parameter updating processes deserve higher priority than other processes, because of their time-critical nature. For this reason, the flag controller 21 provides a parameter updating flag which is set when a parameter updating process is being executed. Other requests from the ONU have to be suspended when the parameter updating flag is set, thereby preventing unwanted interruptions, as well as giving a higher priority to the ongoing parameter updating process.

Figure 20:
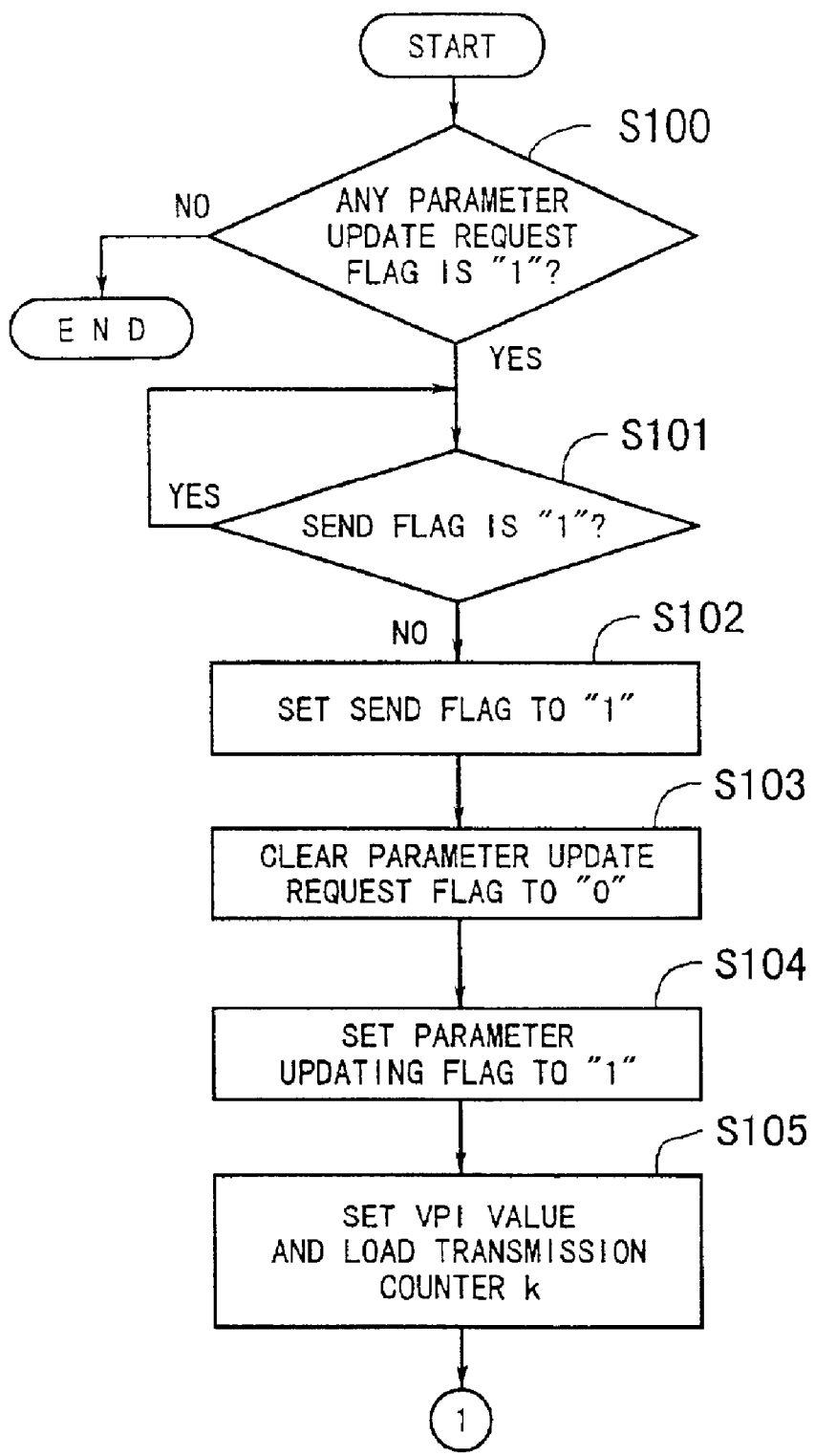
FIGS. 20 and 21 show a flowchart of a process executed at the beginning of a parameter updating process.
Figure 21:
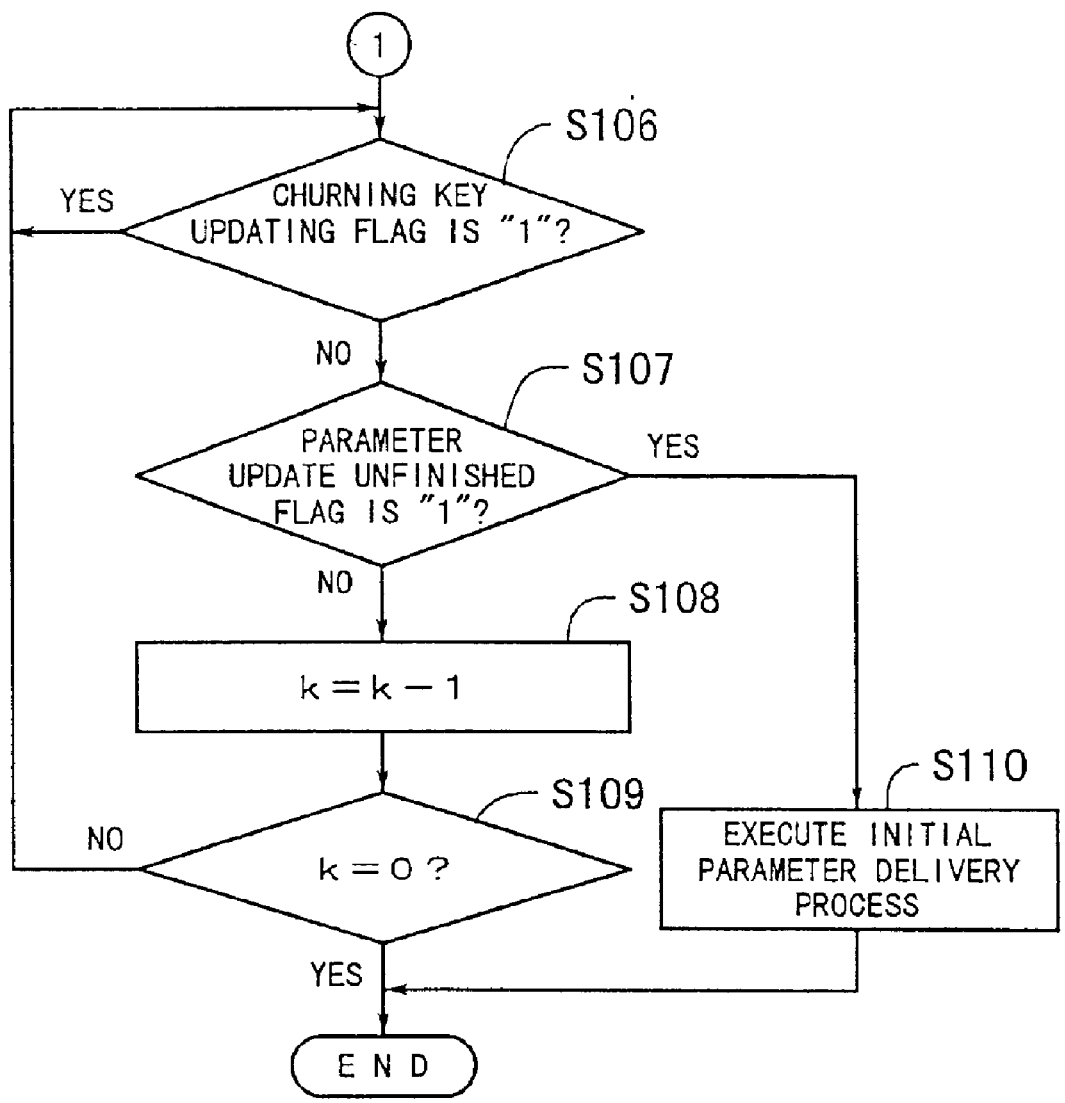

Referring now to FIGS. 20 to 23, the details of the parameter updating process will be explained below. FIGS. 20 and 21 show a flowchart of a process executed at the beginning of each parameter updating process.

(S100) The churning parameter transmission controller 22 tests whether any parameter update request flag is set (note that the ONUs 30a to 30n have their own flags). If the flag is "1", then the process advances to step S101. If the flag is "O," the process Is terminated.

(S101) The churning parameter transmission controller 22 then tests a "send flag." This send flag is a flag that the flag controller 21 provides to indicate that the OLT 20 is sending a churned-VP message. If the send flag is "1," the process repeats step S101 until the flag is cleared to "0." If the send flag is "0," the process advances to step S102.

(1102) The flag controller 21 sets again the send flag to "1," thereby inhibiting the acceptance of other requests.

Unlike the above steps, the following steps S103 and so on can be executed in parallel to serve a plurality of ONUs at a time. Suppose, for example, that three ONUs 30a, 30b, and 30c need to update their churned-VP parameters. Then three processes will run concurrently to handle those requests. The following explanation focuses the parameter updating process for the ONU 30a.

(S103) The flag controller 21 clears the parameter update request flag to "0."

(S104) The flag controller 21 sets the parameter updating flag to "1."

(S105) The churning parameter transmission controller 22 composes a churned-VP message by inserting a relevant value to its VPI field. It also presets a counter k (e.g., k=3) for repetitive transmission of this churned-VP message.

(S106) The churning parameter transmission controller 22 tests the churning key updating flag. If the flag is "1," the process repeats step S106 until the flag is cleared to "0." If the send flag is "0," the process advances to step S107.

(S107) It is examined whether the ONU 30a is still in the operating state 08 or not. That is, if the parameter update unfinished flag is "1," the process branches to step S110. If the flag is "0," the process advances to step S108.

(S108) The churning parameter transmission controller 22 sends out a churned-VP message. It then decrements the transmission counter k by one, so as to manage the number of churned-VP messages to be transmitted.

(S109) If the transmission counter k has reached zero, the process is terminated. If not, the process returns to step S106.

(S110) The churning parameter transmission controller 22 executes an initial parameter delivery process.

Figure 22:
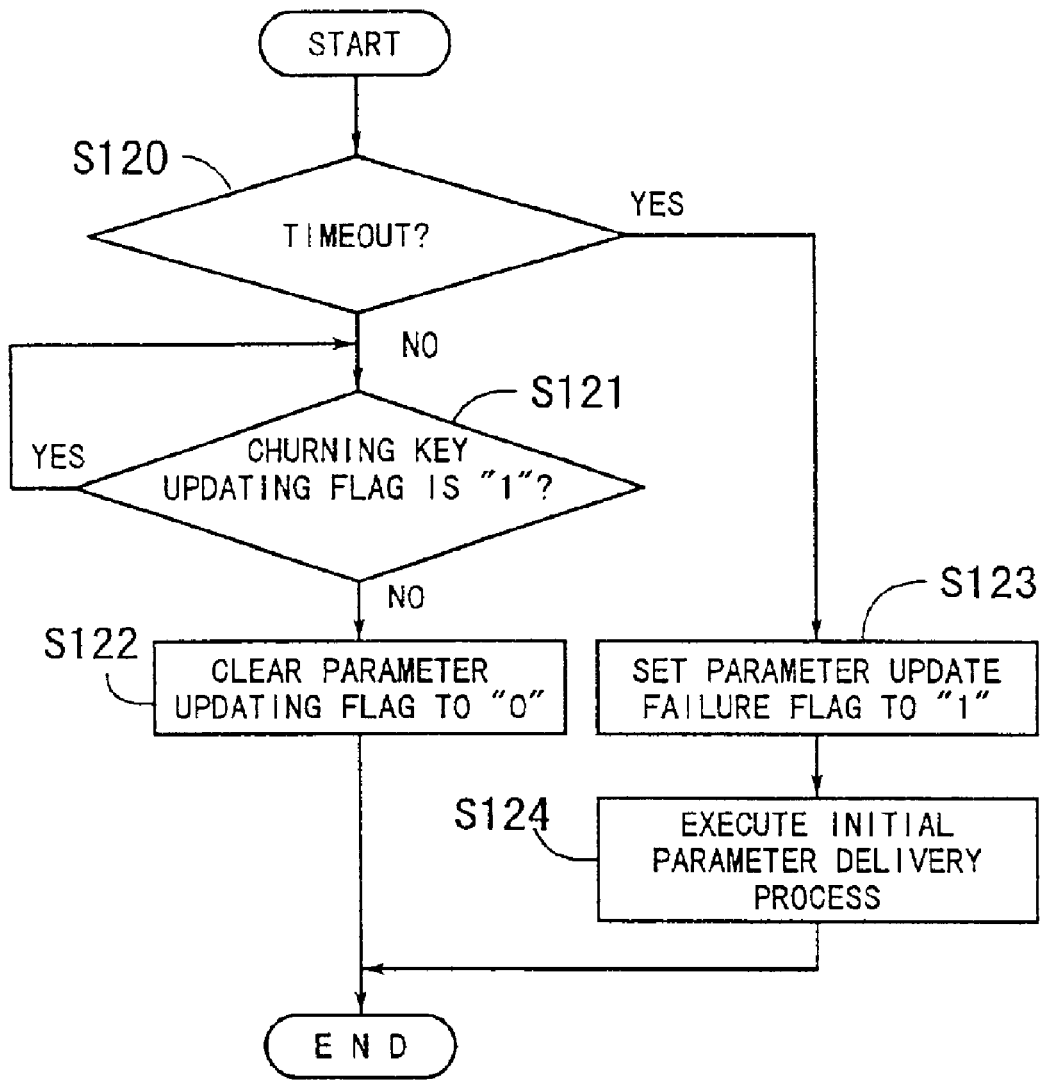
FIG. 22 is a flowchart which shows a process of receiving an acknowledge message.

FIG. 22 is a flowchart which shows a process of receiving an acknowledge message. The ONU 30a sends back an acknowledge message in response to each churned-VP message that is correctly received from the OLT 20. The OLT 20 handles this acknowledge message according to the following steps.

(S120) The OLT 20 checks the message flow by measuring the time between the last churned-VP message and its subsequent acknowledge message. More specifically, the OLT 20 waits for an acknowledge message after sending the churned-VP message three times. If no acknowledge is received within a prescribed period (300 ms) after sending the last churned-VP message, the OLT 20 detects a timeout error. If this is the case, the process branches to step S123. Otherwise, the process advances to step S121.

(S121) The churning key updating flag is tested. If the flag is "1," the process repeats step S121 until it is cleared to "0." If the flag is "0," the process advances to step S122.

(S122) The flag controller 21 clears the parameter updating flag to "0."

(S123) The flag controller 21 sets the parameter update failure flag to "1."

(S124) The churning parameter transmission controller 22 executes an initial parameter delivery process.

Figure 23:
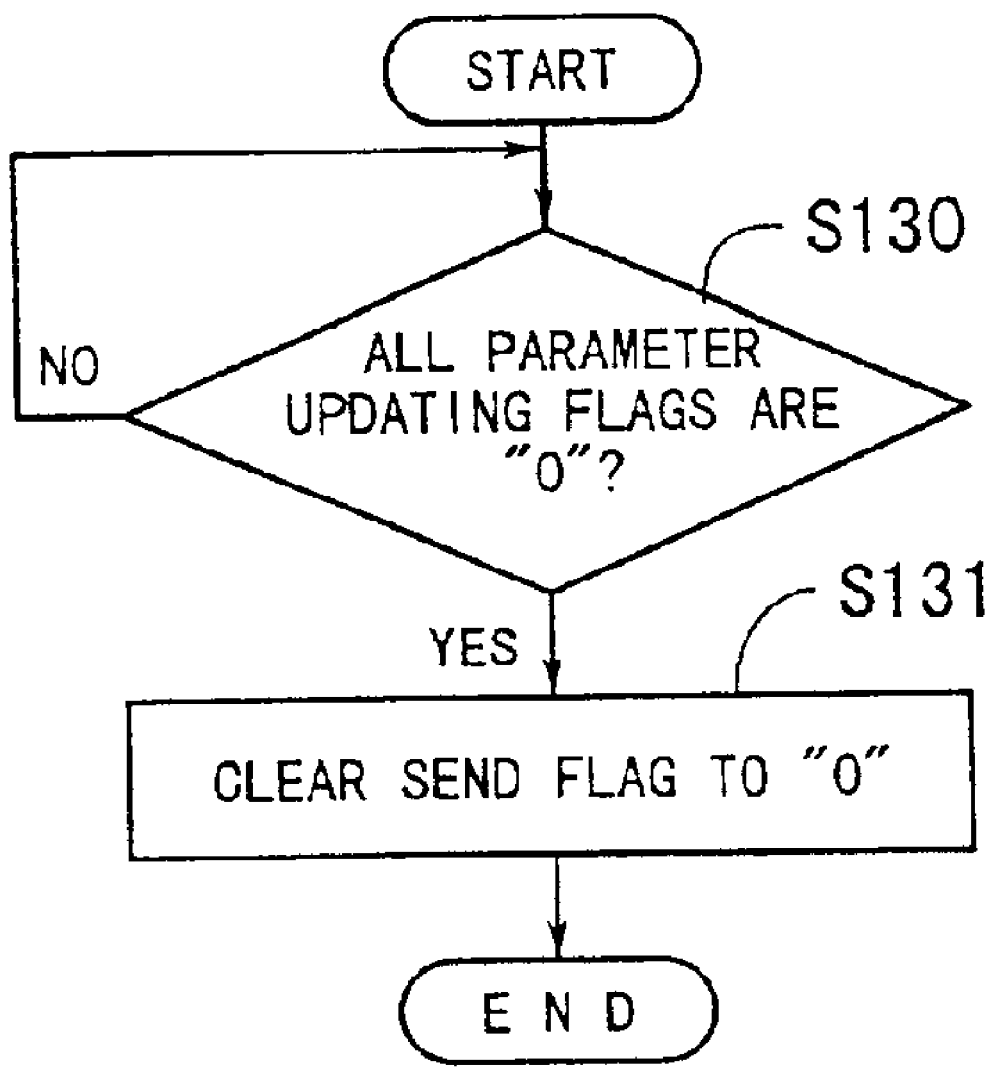
FIG. 23 is a flowchart which shows a process executed at the end of a parameter updating process.

FIG. 23 is a flowchart which shows a process executed at the end of the parameter updating process. This process comprises the following steps.

(S130) If all the parameter updating flags exhibit zeros, this indicates that the process is finished for all the ONUs concerned. If this is the case, the process advances to step S131. Otherwise, the process repeats step S130 until all the non-zero flags are cleared.

(S131) The flag controller 21 clears the send flag to "0," thus enabling other requests.

The next section will describe the function of the churning parameter overwriting unit 23.

After a set of churning parameters are delivered to the ONU 30 through an initial parameter delivery process, the OLT 20 would not send churned-VP messages to the ONU 30 any more, as long as there is no change in the churned-VP parameters. Conventional ONUs and OLTs, however, can neither detect nor correct inconsistency in their churned-VP parameters, once it was introduced for some reason. To address this problem, according to the present invention, the OLT 20 employs a churning parameter overwriting unit 23 which supplies the operating ONUs 30 with churned-VP parameters, being triggered by the completion of initial parameter delivery processes. With the supplied information, the ONUs 30 overwrite their local churned-VP parameters, thus refreshing their information bases during normal operation. Such processes are termed "parameter overwriting processes," which would permit the ONUs 30 and OLT 20 to correct inconsistency in their churned-VP parameters, even if it happened to be introduced for some reason.

The parameter overwriting process can be executed as a lower-priority task, because it is a kind of safety mechanism to maintain the consistency of churned-VP parameters between the OLT 20 and ONUs 30. Accordingly, the churning parameter transmission controller 22 may suspend the transmission requests from the parameter overwriting process, while giving higher priority to other messaging activities including normal parameter updating processes. The parameter overwriting process can run without disturbing other messaging activities.

The churning parameter overwriting unit 23 has an integral timer for use in the parameter overwriting processes. Being activated after each churned-VP message for overwriting purposes, this timer provides a minimum interval of overwriting operations. To avoid conflict with other messages, the churning parameter overwriting unit 23 does not produce the next churned-VP message until the timer is expired. The timer interval can be defined flexibly through a maintenance station.

The transmission of churned-VP messages should be properly controlled not to conflict with churning key update messages. This issue will be discussed as follows.

According to the ITU-T Recommendation G.983.1, various control messages to the ONUs 30 are conveyed by downstream PLOAM cells which are transmitted at regular intervals. It is therefore necessary for the OLT to determine which message to send to the ONUs 30 in the next PLOAM cell, by arbitrating between a plurality of message transmission requests, if any.

As previously explained in FIG. 3, churning key update messages are transmitted at intervals of 16*Tframe. Transmission of churned-VP messages, on the other hand, should be completed three times during a period when the churning key updating flag is not set. To meet those constraints, the churning parameter transmission controller 22 would give priority to a churning key update message, if it conflicted with a churned-VP message. In this case, the OLT 20 first sends the churning key update message three times, automatically at intervals of 16*Tframe, and it then transmits the churned-VP message three times, automatically at intervals of 16*Tframe. It should be noted that the arbitration takes place only at the first instance of those messages. Once the first churning key update message is transmitted, the second and third instances can be sent without conflicting with each other.

Figure 24:
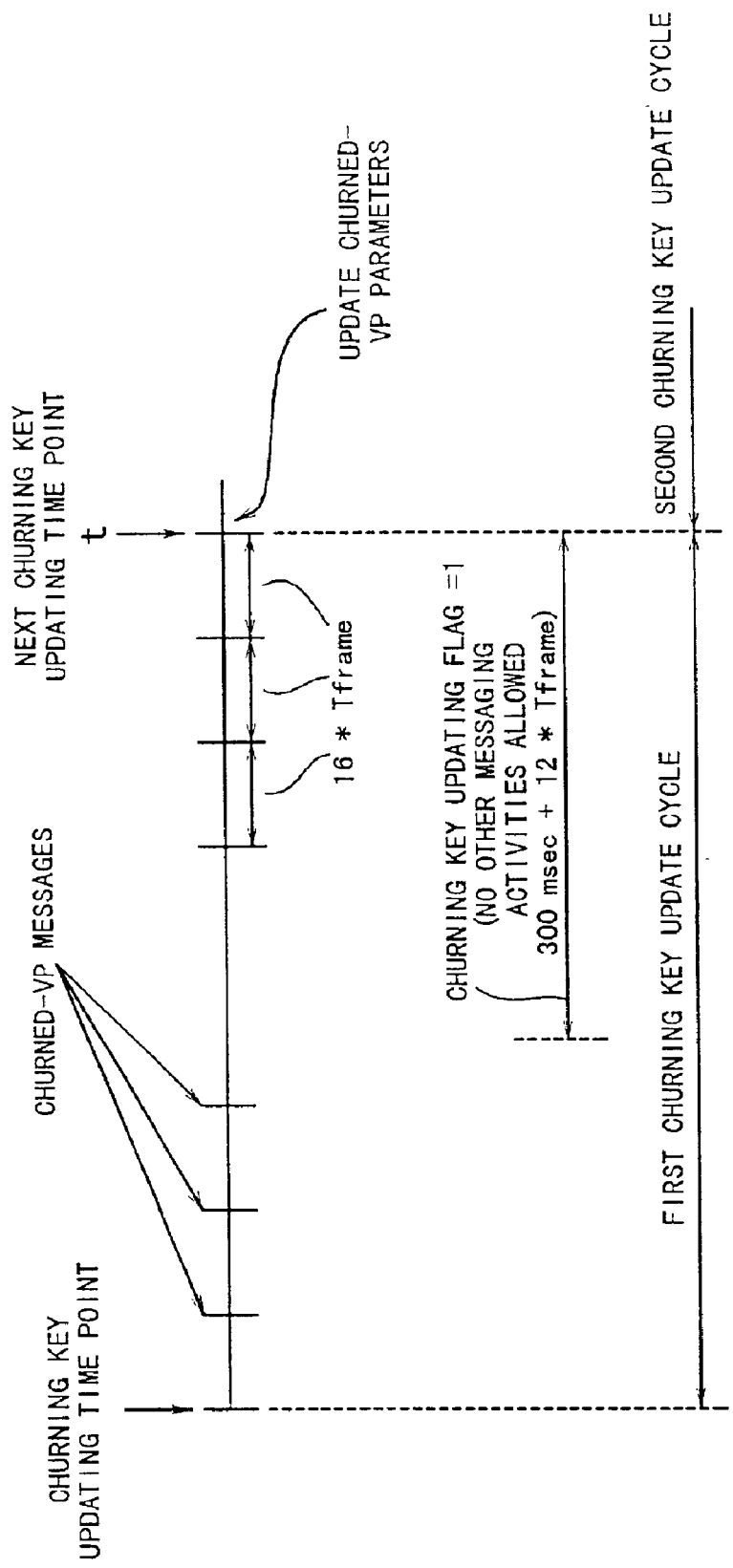
FIG. 24 is a timing diagram which explains how the churned-VP parameters are updated.
Figure 25:
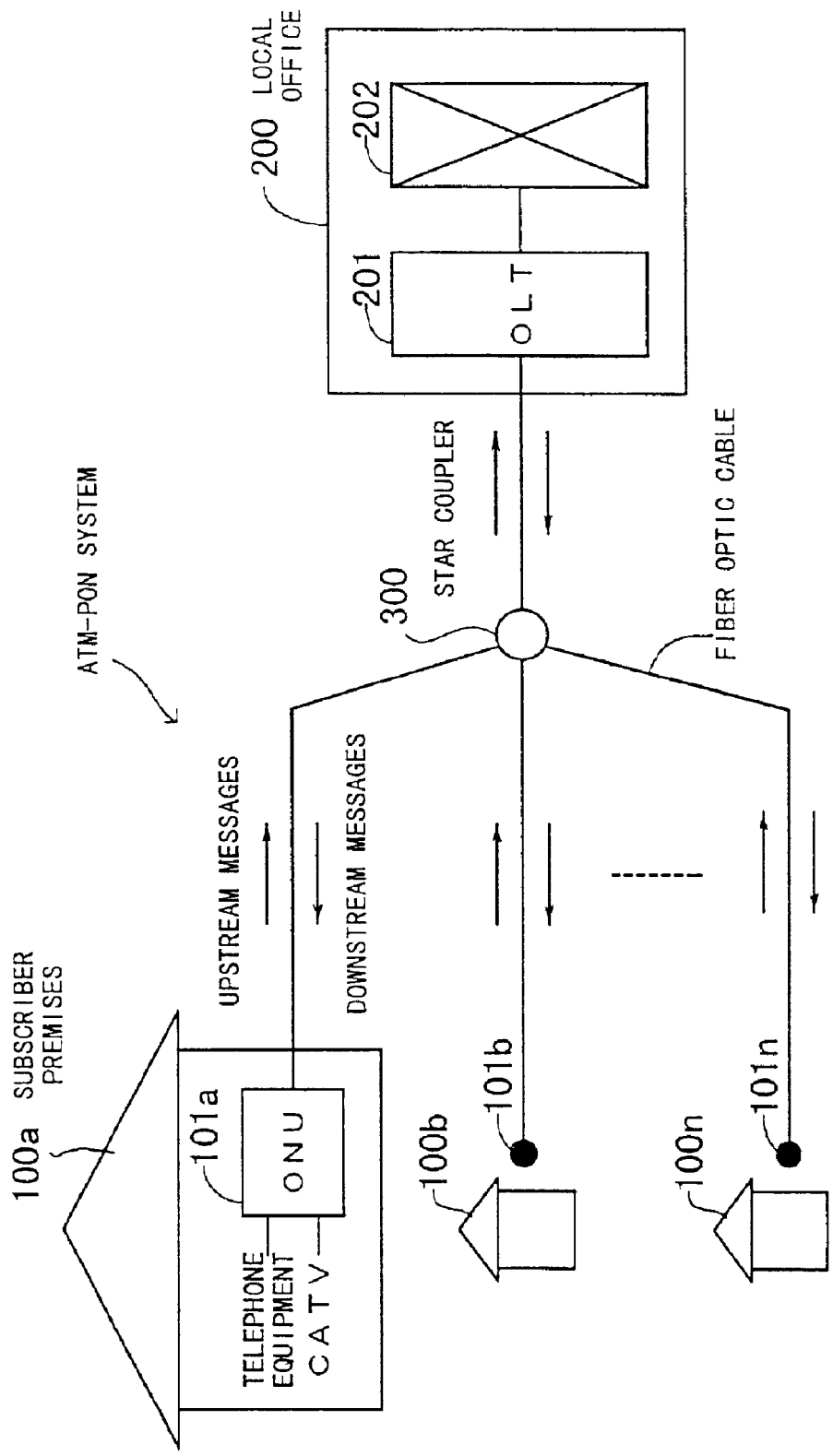
FIG. 25 is a diagram which shows the structure of a conventional ATM-PON system.

Referring lastly to FIG. 24, the operation of the churning parameter updating unit 24 will be described below. While defining the activation timing of churning key updates, the ITU-T Recommendation G.983.1 lacks the definition of when to activate churned-VP updates. Without appropriate coordination, updating churned-VP parameters would introduce inconsistencies in churned-VP parameters between the OLT 20 and ONUs 30.

According to the present invention, the churning parameter updating unit 24 prevents any inconsistent updates by activating the new parameter at the churning key updating time point. FIG. 24 is a timing diagram which explains how the churned-VP parameters are updated. First, the OLT 20 sends a churned-VP message three times. Then the OLT 20 and the receiving ONU 30 activate this new churned-VP information at the first churning key updating time point after the last churned-VP message is sent. In this way, the churned-VP parameters are updated simultaneously at the both ends, without fear of producing inconsistencies.

The above discussion will now be summarized as follows. According to the present invention, the optical network unit comprises a first memory bank serving as active storage that stores currently used churning parameters and a second memory bank serving as backup storage that stores newly updated churning parameters. The first and second memory banks exchange their roles at a predefined time point, and the churning parameters read out of the active storage are used in the next frame to dechurn the information that is extracted from the incoming data stream. This structural arrangement improves the quality of communication control, because it ensures that the dechurning operations at the receiving end is synchronized with the churning operations at the sending end in terms of the usage of updated churning parameters.

Further, according to the present invention, the optical line terminal provides various flags to control the transmission of data streams to the receiving network units. Particularly, it provides control flags for use in the transmission of churning parameters. This feature of the invention improves the quality of communication control, ensuring that the dechurning operations in the receiving end is synchronized with the churning operations in the sending end in terms of the usage of updated churning parameters.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical network unit coupled to an optical access network system, which receives a data stream and dechurns information contained in the received data stream by using a churning key, comprising:
    (a) churning parameter memory means for storing churning parameters that indicate which logical connections are churned or not churned, comprising:
        (a1) first memory means, initially assigned an active role, for storing the churning parameters that are currently used, and
        (a2) second memory means, initially assigned a backup role, for storing newly updated churning parameters,
    wherein said first memory means and second memory means are controlled so that the active and backup roles will alternate with each other at every churning key updating time point at which an updated churning key becomes effective; and
    (b) data dechurning means for receiving a data stream consisting of a plurality of frames and dechurning churned information contained in the data stream according to the churning parameters stored in said first or second memory means currently playing the active role, the churning parameters being activated at the beginning of a frame subsequent to the churning key updating time point
    said first memory means is assigned the backup role, and said second memory means is assigned the active role as a result of said alternating of the active and backup roles at the churning key updating time point; and
    said churning parameter memory means performs a copying process to copy the stored churning parameters from said second memory means to said first memory means, and wherein
    said churning parameter memory means saves a new churning parameter into said first memory means after the copying process is finished, when the new churning parameter is received during the copying process.

2. The optical network unit according to claim 1, wherein said churning parameter memory means comprises said first and second memory means each having two ports for reading out data therefrom.

3. The optical network unit according to claim 1, wherein said churning parameter memory means, after receiving each newly updated churning parameter, verifies whether the received churning parameter has correctly been written to said first or second memory means, and returns an acknowledge message only when the received churning parameter is successfully verified.

4. The optical network unit according to claim 1, further comprising:
    a non-volatile memory; and
    external memory control means for storing the churning parameters into said non-volatile memory.

5. The optical network unit according to claim 4, wherein said external memory control means compares each received churning parameter with the corresponding churning parameter read out of said second memory means currently playing the backup role, so as to write only changed churning parameters to said non-volatile memory.

6. The optical network unit according to claim 4, wherein:
    said external memory control means comprises a local memory to store the churning parameters temporarily, and
    upon power-down, said external memory control means transfers at a time the churning parameters from said local memory to said non-volatile memory.

7. The optical network unit according to claim 4, wherein:
    said external memory control means comprises a local memory to store the churning parameters temporarily; and
    upon power-down, said external memory control means transfers only changed churning parameters from said local memory to said non-volatile memory.

8. The optical network unit according to claim 4, wherein said churning parameter memory means receives the churning parameters from said non-volatile memory only when the optical network unit is in a standby state after power-up.

9. The optical network unit according to claim 4, wherein said churning parameter memory means activates either of the churning parameters received from said non-volatile memory and a set of newly supplied churning parameters after power-up.

10. The optical network unit according to claim 1, further comprising dechurning mask means for disabling the dechurning function of said data dechurning means during a period from a restarting time point to the churning key updating time point, said restarting time point being a time point when the optical network unit reenters an operating state from another state after having left the operating state.

* * * * *